(12) United States Patent
Miller

(10) Patent No.: US 7,670,243 B2
(45) Date of Patent: Mar. 2, 2010

(54) CONTINUOUSLY VARIABLE TRANSMISSION

(75) Inventor: Donald C. Miller, Fallbrook, CA (US)

(73) Assignee: Fallbrook Technologies, Inc., San Diego, CA (US)

(*) Notice: Subject to any disclaimer, the term of this patent is extended or adjusted under 35 U.S.C. 154(b) by 580 days.

(21) Appl. No.: 11/509,789

(22) Filed: Aug. 23, 2006

(65) Prior Publication Data
US 2007/0049450 A1   Mar. 1, 2007

Related U.S. Application Data

(60) Provisional application No. 60/710,951, filed on Aug. 24, 2005.

(51) Int. Cl.
*F16H 15/40* (2006.01)

(52) U.S. Cl. ........................................ 475/189; 475/196

(58) Field of Classification Search ................. 475/189, 475/196, 216; 74/721
See application file for complete search history.

(56) References Cited

U.S. PATENT DOCUMENTS

| | | | |
|---|---|---|---|
| 719,595 A | 2/1903 | Huss | |
| 1,121,210 A | 12/1914 | Techel | |
| 1,175,677 A | 3/1916 | Barnes | |
| 1,380,006 A | 5/1921 | Nielson | |
| 1,629,902 A | 5/1927 | Arter et al. | |
| 1,686,446 A * | 10/1928 | Gilman | 475/189 |
| 1,858,696 A | 5/1932 | Weiss | |
| 1,903,228 A | 3/1933 | Thomson | |
| 2,060,884 A | 11/1936 | Madle | |
| 2,086,491 A | 7/1937 | Dodge | |
| 2,112,763 A | 3/1938 | Cloudsley | |
| 2,152,796 A | 4/1939 | Erban | |
| 2,209,254 A | 7/1940 | Ahnger | |
| 2,469,653 A | 5/1949 | Kopp | |

(Continued)

FOREIGN PATENT DOCUMENTS

CH   118064   12/1926

(Continued)

OTHER PUBLICATIONS

International Search Report for International application No. PCT/US2006/033104 dated Dec. 20, 2006.

*Primary Examiner*—David D Le
*Assistant Examiner*—Derek D Knight
(74) *Attorney, Agent, or Firm*—Knobbe, Martens, Olson & Bear LLP

(57) ABSTRACT

Embodiments of the inventions disclosed include a continuously variable transmission (CVT) where power is transmitted from a group of balls to a shaft via an idler. In one application, the CVT couples to a gearbox and to a generator of a wind turbine. Traction elements of a CVT can be coated and/or textured, using various coating materials and textures, via disclosed coating and/or texturing methods. Methods and systems for shifting a CVT are disclosed. Certain components for a CVT are disclosed. For example, in one embodiment, a CVT includes a shaft having a spline and a shift flange. In another embodiment, a CVT includes a stator adapted to cooperate with shifter components. Disclosed is a CVT configured to produce a variable output speed that is always greater than an input speed. In one embodiment, a CVT produces a variable output speed that is always lower than an input speed.

10 Claims, 20 Drawing Sheets

U.S. PATENT DOCUMENTS

| | | |
|---|---|---|
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,748,614 A | 6/1956 | Weisel |
| 2,730,904 A | 7/1956 | Rennerfeld |
| 2,868,038 A | 1/1959 | Billeter |
| 2,913,932 A | 11/1959 | Oehru |
| 2,931,234 A | 4/1960 | Hayward |
| 2,931,235 A | 4/1960 | Hayward |
| 2,959,063 A | 11/1960 | Perry |
| 2,959,972 A | 11/1960 | Madson |
| 3,184,983 A | 5/1965 | Kraus |
| 3,216,283 A | 11/1965 | General |
| 3,248,960 A | 5/1966 | Schottler |
| 3,273,468 A | 9/1966 | Allen |
| 3,280,646 A | 10/1966 | Lemieux |
| 3,464,281 A | 9/1969 | Hiroshi et al. |
| 3,487,726 A | 1/1970 | Burnett |
| 3,487,727 A | 1/1970 | Gustafsson |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,820,416 A | 6/1974 | Kraus |
| 3,891,235 A | 6/1975 | Shelly |
| 3,954,282 A | 5/1976 | Hege |
| 3,984,129 A | 10/1976 | Hege |
| 3,996,807 A | 12/1976 | Adams |
| 4,103,514 A * | 8/1978 | Grosse-Entrup ............ 464/167 |
| 4,169,609 A | 10/1979 | Zampedro |
| 4,177,683 A | 12/1979 | Moses |
| 4,227,712 A | 10/1980 | Dick |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,496,051 A | 1/1985 | Ortner |
| 4,574,649 A | 3/1986 | Seol |
| 4,585,429 A | 4/1986 | Marier |
| 4,628,766 A | 12/1986 | De Brie Perry |
| 4,630,839 A | 12/1986 | Seol |
| 4,700,581 A | 10/1987 | Tibbals, Jr. |
| 4,735,430 A | 4/1988 | Tomkinson |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,857,035 A | 8/1989 | Anderson |
| 4,869,130 A | 9/1989 | Wiecko |
| 4,900,046 A | 2/1990 | Aranceta-Angoitia |
| 4,909,101 A | 3/1990 | Terry |
| 4,961,477 A | 10/1990 | Sweeney |
| 5,020,384 A | 6/1991 | Kraus |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,273,501 A | 12/1993 | Schievelbusch |
| 5,318,486 A | 6/1994 | Lutz |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,451,070 A | 9/1995 | Lindsay et al. |
| 5,601,301 A | 2/1997 | Liu |
| 5,645,507 A | 7/1997 | Hathaway |
| 5,651,750 A | 7/1997 | Imanishi et al. |
| 5,690,346 A | 11/1997 | Keskitalo |
| 5,746,676 A | 5/1998 | Kawase et al. |
| 5,823,052 A | 10/1998 | Nobumoto |
| 5,846,155 A | 12/1998 | Taniguchi et al. |
| 5,899,827 A | 5/1999 | Nakano et al. |
| 5,967,933 A | 10/1999 | Valdenaire |
| 5,984,826 A | 11/1999 | Nakano |
| 6,000,707 A | 12/1999 | Miller |
| 6,045,481 A | 4/2000 | Kumagai |
| 6,053,833 A | 4/2000 | Masaki |
| 6,053,841 A | 4/2000 | Koide et al. |
| 6,066,067 A | 5/2000 | Greenwood |
| 6,071,210 A | 6/2000 | Kato |
| 6,095,940 A | 8/2000 | Ai et al. |
| 6,119,539 A | 9/2000 | Papanicolaou |
| 6,119,800 A | 9/2000 | McComber |
| 6,159,126 A | 12/2000 | Oshidan |
| 6,186,922 B1 | 2/2001 | Bursal et al. |
| 6,241,636 B1 * | 6/2001 | Miller ..................... 476/38 |
| 6,243,638 B1 | 6/2001 | Abo et al. |
| 6,322,475 B2 | 11/2001 | Miller |
| 6,325,386 B1 | 12/2001 | Shoge |
| 6,340,067 B1 | 1/2002 | Fujiwara |
| 6,390,946 B1 | 5/2002 | Hibi et al. |
| 6,406,399 B1 | 6/2002 | Ai |
| 6,419,608 B1 | 7/2002 | Miller |
| 6,461,268 B1 | 10/2002 | Milner |
| 6,499,373 B2 | 12/2002 | Van Cor |
| 6,551,210 B2 | 4/2003 | Miller |
| 6,575,047 B2 | 6/2003 | Reik et al. |
| 6,672,418 B1 | 1/2004 | Makino |
| 6,676,559 B2 | 1/2004 | Miller |
| 6,679,109 B2 | 1/2004 | Gierling et al. |
| 6,689,012 B2 | 2/2004 | Miller |
| 6,805,654 B2 | 10/2004 | Nishii |
| 6,931,316 B2 | 8/2005 | Joe et al. |
| 6,945,903 B2 | 9/2005 | Miller |
| 6,949,049 B2 | 9/2005 | Miller |
| 6,991,579 B2 | 1/2006 | Kobayashi et al. |
| 7,011,600 B2 | 3/2006 | Miller et al. |
| 7,014,591 B2 | 3/2006 | Miller |
| 7,029,418 B2 | 4/2006 | Taketsuna et al. |
| 7,036,620 B2 | 5/2006 | Miller et al. |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,086,979 B2 | 8/2006 | Frenken |
| 7,086,981 B2 | 8/2006 | Ali et al. |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,163,486 B2 | 1/2007 | Miller et al. |
| 7,166,052 B2 | 1/2007 | Miller et al. |
| 7,197,915 B2 | 4/2007 | Luh et al. |
| 7,246,672 B2 | 7/2007 | Shirai et al. |
| 7,275,610 B2 | 10/2007 | Kuang et al. |
| 2001/0008192 A1 | 7/2001 | Morisawa |
| 2003/0022753 A1 | 1/2003 | Mizuno et al. |
| 2003/0221892 A1 | 12/2003 | Matsumoto et al. |
| 2004/0119345 A1 | 6/2004 | Takano |
| 2004/0204283 A1 | 10/2004 | Inoue |

| | | |
|---|---|---|
| 2004/0224808 A1 | 11/2004 | Miller et al. |
| 2005/0073127 A1 | 4/2005 | Miller |
| 2005/0079944 A1 | 4/2005 | Miller |
| 2005/0079948 A1 | 4/2005 | Miller et al. |
| 2005/0085326 A1 | 4/2005 | Miller |
| 2005/0085327 A1 | 4/2005 | Miller |
| 2005/0085334 A1 | 4/2005 | Miller et al. |
| 2005/0085336 A1 | 4/2005 | Miller et al. |
| 2005/0085337 A1 | 4/2005 | Miller et al. |
| 2005/0085338 A1 | 4/2005 | Miller et al. |
| 2005/0096176 A1 | 5/2005 | Miller |
| 2005/0096179 A1 | 5/2005 | Miller |
| 2005/0113202 A1 | 5/2005 | Miller et al. |
| 2005/0113210 A1 | 5/2005 | Miller |
| 2005/0117983 A1 | 6/2005 | Miller et al. |
| 2005/0119086 A1 | 6/2005 | Miller et al. |
| 2005/0119087 A1 | 6/2005 | Miller et al. |
| 2005/0119090 A1 | 6/2005 | Miller et al. |
| 2005/0119092 A1 | 6/2005 | Miller et al. |
| 2005/0119093 A1 | 6/2005 | Miller et al. |
| 2005/0119094 A1 | 6/2005 | Miller et al. |
| 2005/0124453 A1 | 6/2005 | Miller |
| 2005/0124456 A1 | 6/2005 | Miller et al. |
| 2005/0130784 A1 | 6/2005 | Miller et al. |
| 2005/0137046 A1 | 6/2005 | Miller et al. |
| 2005/0137051 A1 | 6/2005 | Miller et al. |
| 2005/0137052 A1 | 6/2005 | Miller et al. |
| 2005/0148422 A1 | 7/2005 | Miller et al. |
| 2005/0148423 A1 | 7/2005 | Miller et al. |
| 2005/0153808 A1 | 7/2005 | Miller et al. |
| 2005/0153809 A1 | 7/2005 | Miller et al. |
| 2005/0153810 A1 | 7/2005 | Miller et al. |
| 2005/0159265 A1 | 7/2005 | Miller et al. |
| 2005/0159266 A1 | 7/2005 | Miller et al. |
| 2005/0159267 A1 | 7/2005 | Miller et al. |
| 2005/0164819 A1 | 7/2005 | Miller et al. |
| 2005/0176544 A1 | 8/2005 | Miller et al. |
| 2005/0176545 A1 | 8/2005 | Miller et al. |
| 2005/0178893 A1 | 8/2005 | Miller et al. |
| 2005/0197231 A1 | 9/2005 | Miller et al. |
| 2005/0209041 A1 | 9/2005 | Miller |
| 2005/0227809 A1 | 10/2005 | Bitzer et al. |
| 2006/0084549 A1 | 4/2006 | Smithson et al. |
| 2006/0108956 A1 | 5/2006 | Clark |
| 2006/0180363 A1 | 8/2006 | Uchisasai |
| 2007/0041823 A1 | 2/2007 | Miller |
| 2007/0155580 A1 | 7/2007 | Nichols et al. |

FOREIGN PATENT DOCUMENTS

| | | |
|---|---|---|
| CN | 1157379 A | 8/1997 |
| DE | 498 701 | 5/1930 |
| DE | 2 310880 | 9/1974 |
| DE | 2 136 243 | 1/1975 |
| DE | 2436496 | 2/1975 |
| DE | 39 40 919 A1 | 6/1991 |
| DE | 10155372 A1 | 5/2003 |
| EP | 0 432 742 | 12/1990 |
| EP | 635639 A1 | 1/1995 |
| EP | 1136724 | 9/2001 |
| FR | 620375 | 4/1927 |
| FR | 2590638 | 5/1987 |
| GB | 592320 | 9/1947 |
| GB | 906 002 A | 9/1962 |
| GB | 919430 A | 2/1963 |
| GB | 1 376 057 | 12/1974 |
| GB | 2 035 482 | 6/1980 |
| GB | 2 080 452 | 8/1982 |
| JP | 42-2844 | 2/1967 |
| JP | 48-54371 | 7/1973 |
| JP | 51-150380 | 12/1976 |
| JP | 47-20535 | 8/1977 |
| JP | 53 04816 | 1/1978 |
| JP | 55-135259 | 4/1979 |
| JP | 59069565 | 4/1984 |
| JP | 63219953 | 9/1988 |
| JP | 02157483 | 6/1990 |
| JP | 02271142 | 6/1990 |
| JP | 03-149442 | 6/1991 |
| JP | 52-35481 | 9/1993 |
| JP | 08170706 A | 7/1996 |
| JP | 09024743 A | 1/1997 |
| JP | 411063130 | 3/1999 |
| JP | 2004162652 A | 6/2004 |
| JP | 8-247245 | 9/2004 |
| JP | 2005/240928 A | 9/2005 |
| NE | 98467 | 7/1961 |

* cited by examiner

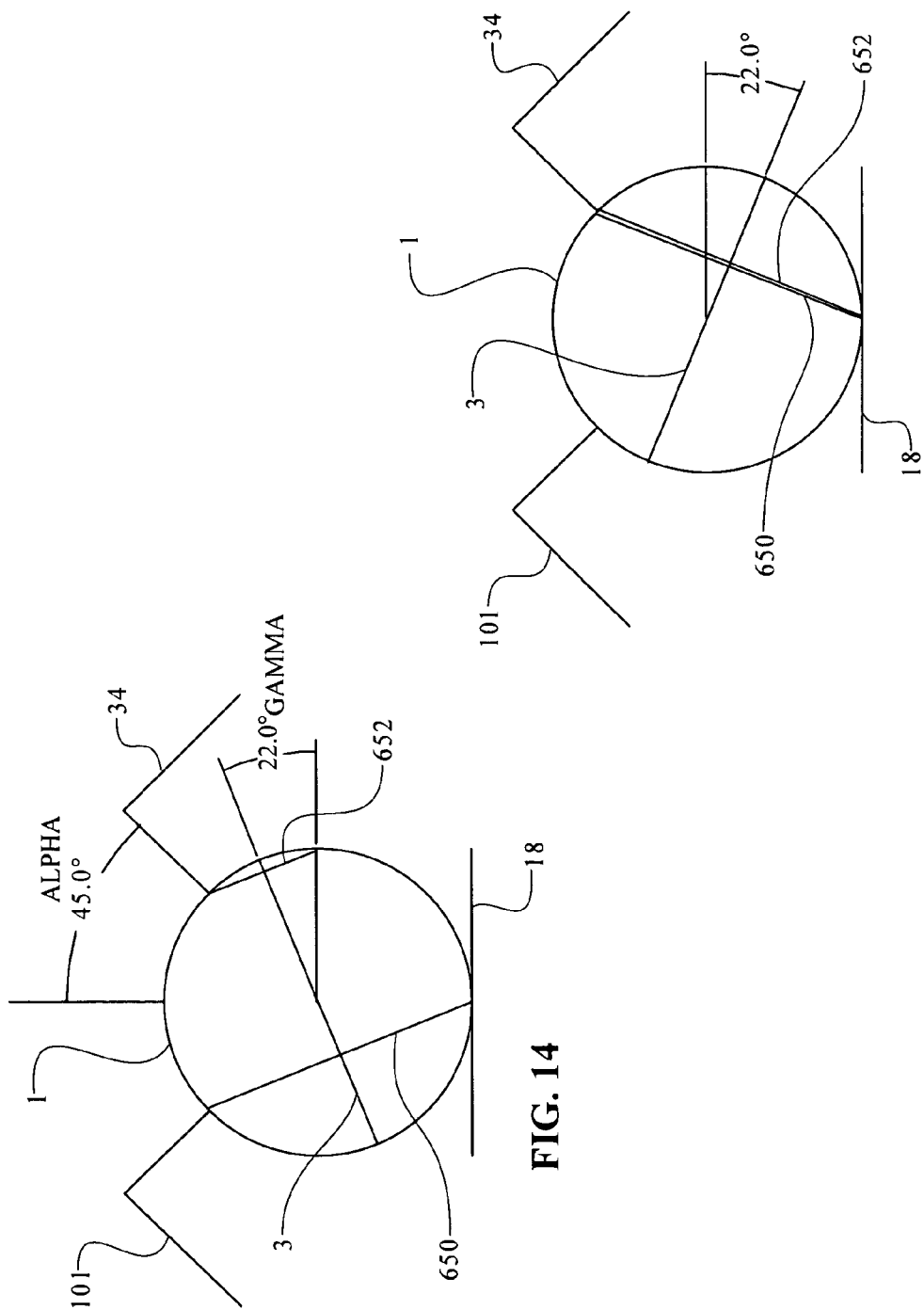

FIG. 19

| 50 | alpha | 80 | idler diameter | | | 50 | ball diameter | | 81.07 | Input disc radius | |
|---|---|---|---|---|---|---|---|---|---|---|---|
| gamma | Ball radius @ input | Ball radius @ output | Ball radius @ idler | Speed Increaser Ratio | Ratio range | Average speed increase | Normal Mode Speed Ratio | Speed Reducer Ratio | Ratio range | Average speed decrease |
| -25 | 22.7 | 6.5 | 22.7 | 2.03 | | | 0.29 | 0.49 | | |
| -24 | 22.5 | 6.9 | 22.8 | 2.06 | | | 0.31 | 0.49 | | |
| -23 | 22.3 | 7.3 | 23.0 | 2.09 | | | 0.33 | 0.48 | | |
| -22 | 22.1 | 7.7 | 23.2 | 2.13 | | | 0.35 | 0.47 | | |
| -21 | 21.9 | 8.1 | 23.3 | 2.16 | | | 0.37 | 0.46 | | |
| -20 | 21.7 | 8.6 | 23.5 | 2.20 | | | 0.39 | 0.45 | | |
| -15 | 20.5 | 10.6 | 24.1 | 2.39 | | | 0.52 | 0.42 | | |
| -10 | 19.2 | 12.5 | 24.6 | 2.61 | | | 0.65 | 0.38 | | |
| -5 | 17.7 | 14.3 | 24.9 | 2.86 | | | 0.81 | 0.35 | | |
| 0 | 16.1 | 16.1 | 25.0 | 3.15 | | | 1.00 | 0.32 | | |
| 5 | 14.3 | 17.7 | 24.9 | 3.52 | 1.23 | 3.19 | 1.23 | 0.28 | 1.23 | 0.317 |
| 10 | 12.5 | 19.2 | 24.6 | 3.99 | 1.53 | 3.30 | 1.53 | 0.25 | 1.53 | 0.317 |
| 15 | 10.6 | 20.5 | 24.1 | 4.63 | 1.94 | 3.51 | 1.94 | 0.22 | 1.94 | 0.317 |
| 20 | 8.6 | 21.7 | 23.5 | 5.57 | 2.53 | 3.88 | 2.53 | 0.18 | 2.53 | 0.317 |
| 21 | 8.1 | 21.9 | 23.3 | 5.81 | 2.69 | 3.99 | 2.69 | 0.17 | 2.69 | 0.317 |
| 22 | 7.7 | 22.1 | 23.2 | 6.08 | 2.86 | 4.10 | 2.86 | 0.16 | 2.86 | 0.317 |
| 23 | 7.3 | 22.3 | 23.0 | 6.38 | 3.05 | 4.24 | 3.05 | 0.16 | 3.05 | 0.317 |
| 24 | 6.9 | 22.5 | 22.8 | 6.72 | 3.26 | 4.39 | 3.26 | 0.15 | 3.26 | 0.317 |
| 25 | 6.5 | 22.7 | 22.7 | 7.10 | 3.50 | 4.56 | 3.50 | 0.14 | 3.50 | 0.317 |

FIG. 20

| gamma | alpha 35 Ball radius @ input | 80 Ball radius @ output | idler diameter Ball radius @ idler | Speed Increaser Ratio | 50 Ratio range | ball diameter Average speed increase | Normal Mode Speed Ratio | 85.48 Speed Reducer Ratio | Input disc radius Ratio range | Average speed decrease |
|---|---|---|---|---|---|---|---|---|---|---|
| -25 | 24.6 | 12.5 | 22.7 | 1.97 | | | 0.51 | 0.51 | | |
| -24 | 24.5 | 12.9 | 22.8 | 1.99 | | | 0.52 | 0.50 | | |
| -23 | 24.5 | 13.2 | 23.0 | 2.01 | | | 0.54 | 0.50 | | |
| -22 | 24.4 | 13.6 | 23.2 | 2.03 | | | 0.56 | 0.49 | | |
| -21 | 24.3 | 14.0 | 23.3 | 2.06 | | | 0.58 | 0.49 | | |
| -20 | 24.1 | 14.3 | 23.5 | 2.08 | | | 0.59 | 0.48 | | |
| -15 | 23.5 | 16.1 | 24.1 | 2.20 | | | 0.68 | 0.46 | | |
| -10 | 22.7 | 17.7 | 24.6 | 2.32 | | | 0.78 | 0.43 | | |
| -5 | 21.7 | 19.2 | 24.9 | 2.46 | | | 0.88 | 0.41 | | |
| 0 | 20.5 | 20.5 | 25.0 | 2.61 | | | 1.00 | 0.38 | | |
| 5 | 19.2 | 21.7 | 24.9 | 2.78 | 1.13 | 2.62 | 1.13 | 0.36 | 1.13 | 0.383 |
| 10 | 17.7 | 22.7 | 24.6 | 2.98 | 1.28 | 2.65 | 1.28 | 0.34 | 1.28 | 0.383 |
| 15 | 16.1 | 23.5 | 24.1 | 3.21 | 1.46 | 2.70 | 1.46 | 0.31 | 1.46 | 0.383 |
| 20 | 14.3 | 24.1 | 23.5 | 3.50 | 1.68 | 2.79 | 1.68 | 0.29 | 1.68 | 0.383 |
| 21 | 14.0 | 24.3 | 23.3 | 3.57 | 1.74 | 2.81 | 1.74 | 0.28 | 1.74 | 0.383 |
| 22 | 13.6 | 24.4 | 23.2 | 3.64 | 1.79 | 2.84 | 1.79 | 0.27 | 1.79 | 0.383 |
| 23 | 13.2 | 24.5 | 23.0 | 3.71 | 1.85 | 2.86 | 1.85 | 0.27 | 1.85 | 0.383 |
| 24 | 12.9 | 24.5 | 22.8 | 3.79 | 1.91 | 2.89 | 1.91 | 0.26 | 1.91 | 0.383 |
| 25 | 12.5 | 24.6 | 22.7 | 3.87 | 1.97 | 2.92 | 1.97 | 0.26 | 1.97 | 0.383 |

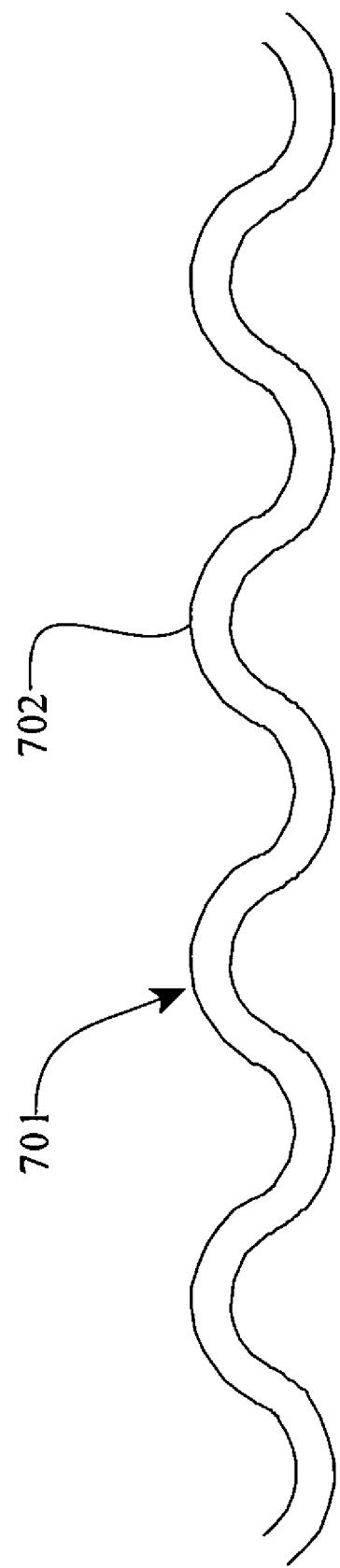

CONTINUOUSLY VARIABLE TRANSMISSION

RELATED APPLICATIONS

This application claims the benefit of, and incorporates by reference in its entirety, U.S. Provisional Application No. 60/710,951, filed on Aug. 24, 2005.

BACKGROUND OF THE INVENTION

1. Field of the Invention

The field of the invention relates generally to transmissions, and more particularly the invention relates to continuously variable transmissions.

2. Description of the Related Art

In order to provide a continuously variable transmission, various traction roller transmissions that transmit power through traction rollers supported in a housing between torque input and output discs have been developed. In such transmissions, the traction rollers are mounted on support structures which, when pivoted, cause the engagement of traction rollers with the torque discs in circles of varying diameters depending on the desired transmission ratio.

The use of a driving hub for a vehicle with a variable adjustable transmission ratio is known. In some instances a transmission uses iris plates to tilt the axis of rotation of the rollers. Other transmissions include a shaft about which an input disc and an output disc rotate. The input and output discs mount on the shaft and contact balls disposed equidistantly and radially about the shaft. The balls are in frictional contact with both discs and transmit power from the input disc to the output disc. An idler located concentrically over the shaft and between the balls aids in maintaining frictional contact between the balls and the input and output discs.

Wind turbines usually have drive trains that include gearboxes for managing power transfer from a rotor to a generator. Continuously variable transmissions such as those described below offer advantages to improve the performance and efficiency of wind turbines, typically resulting in lower cost of energy production.

SUMMARY OF THE INVENTION

The systems and methods illustrated and described herein have several features, no single one of which is solely responsible for its desirable attributes. Without limiting the scope as expressed by the description that follows, its more prominent features will now be discussed briefly. After considering this discussion, and particularly after reading the section entitled "Detailed Description of the Preferred Embodiment" one will understand how the features of the system and methods provide several advantages over traditional systems and methods.

In one aspect of the invention, a variable speed transmission comprises a longitudinal axis, balls distributed radially about the longitudinal axis, each ball having a tiltable axis about which it rotates, a rotatable input disc in contact with each of the balls, an output disc in contact with each of the balls, a rotatable idler in contact with each of the balls, a cage adapted to maintain the radial position and axial alignment of the balls and that is rotatable about the longitudinal axis, and an idler shaft operationally coupled to the idler and adapted to receive a torque output from the idler and transmit the torque output out of the transmission.

Some embodiments comprise a cage adapted to align the tiltable axes of the balls and further adapted to maintain the angular and radial positions of the balls. In some embodiments, the transmission disclosed here couples to a planetary gearset. For example, in one embodiment an input torque is supplied to a planetary gearset, wherein the planet carrier couples to the input disc, the sun gear couples to the cage, the ring gear is fixed and does not rotate, and an output torque is supplied from the transmission by the output disc.

In another aspect an axial force generator is disclosed for use with transmission embodiments described herein that is adapted to generate an axial force that increases the traction between the input disc, the balls, the idler and the output disc. In some embodiments, an amount of axial force generated by the axial force generator is a function of the transmission ratio of the transmission.

In other embodiments, each of the input disc, the balls, the output disc, and the idler have contact surfaces that are coated with a friction increasing coating material. The coating material of certain embodiments is a ceramic or a cermet. In yet other embodiments, the coating is a material selected from the group consisting of silicon nitride, silicon carbide, electroless nickel, electroplated nickel, or any combination thereof.

In still another aspect, a variable speed transmission is described comprising; first and second pluralities of balls distributed radially about the longitudinal axis, first and second rotatable input discs, an input shaft coaxial with the longitudinal axis and connected to the first and second input discs, a rotatable output disc positioned between the first and second pluralities of balls and in contact with each of the first and second pluralities of balls, a first generally cylindrical idler positioned radially inward of and in contact with each of the first plurality of balls, and a second generally cylindrical idler positioned radially inward of and in contact with each of the second plurality of balls.

For use with many embodiments described herein there is also disclosed an axial force generator adapted to apply an axial force to increase contact force between the input disc, the output disc and the plurality of speed adjusters, the axial force generator further comprising, a bearing disc coaxial with and rotatable about the longitudinal axis having an outer diameter and an inner diameter and having a threaded bore formed in its inner diameter, a plurality of perimeter ramps attached to a first side of the bearing disc near its outer diameter, a plurality of bearings adapted to engage the plurality of bearing disc ramps, a plurality of input disc perimeter ramps mounted on the input disc on a side opposite of the speed adjusters adapted to engage the bearings, a generally cylindrical screw coaxial with and rotatable about the longitudinal axis and having male threads formed along its outer surface, which male threads are adapted to engage the threaded bore of the bearing disc, a plurality of central screw ramps attached to the screw, and a plurality of central input disc ramps affixed to the input disc and adapted to engage the plurality of central screw ramps.

In another aspect, a support cage is disclosed that supports and positions a plurality of speed adjusting tiltable balls in a rolling traction transmission, which utilizes an input disc and an output disc on either side of the plurality of balls, the cage comprising; first and second flat support discs that are each a generally circular sheet having a plurality of slots extending radially inward from an outer edge, each slot having two sides, and a plurality of flat supporting spacers extending between said first and second support discs each spacer having a front side, a back side, a first end and a second end, wherein the first and second ends each have a mounting surface, wherein each mounting surface has a curved surface, and wherein the spacers are positioned angularly about the support discs between the grooves in the support discs such that the curved surfaces are aligned with the sides of the grooves.

In yet another aspect, a support leg for a ratio changing mechanism, which changes the transmission ratio in a rolling traction transmission by tilting an axle that forms the axis of rotation of a ratio-determining ball, is disclosed that comprises: an elongated body, an axle-connecting end, a cam end opposite the axle-connecting end, a front side that faces the ball and a backside that faces away from the ball, and a central support portion between the axle-connecting end and the cam end, wherein the axle-connecting end has a bore formed through it adapted to receive the axle, and wherein a convexly curved camming surface is formed on the front side of the cam end that is adapted to assist in controlling the alignment of the bore.

In some embodiments, the invention comprises a variable speed transmission having a longitudinal axis and a plurality of balls distributed radially about the longitudinal axis. Each ball has a tiltable axis about which it rotates. The transmission also includes a rotatable input disc in contact with each of the balls. The transmission has a rotatable idler coaxial about the longitudinal axis and in contact with each of the balls, wherein the idler is adapted to transfer power. Another feature of the inventive transmission is that the idler can be configured to transfer power at a higher average speed than the input disc. In some embodiments, the idler transfers power at a speed higher than the input disc in all ratios.

In yet another embodiment, the invention includes a variable speed transmission having a longitudinal axis and several spherical rollers distributed radially about the longitudinal axis, each roller is preferably fitted with a tiltable axis about which it rotates. The transmission may also include an input disc in contact with the rollers. The transmission may additionally have an idler rotatable about the longitudinal axis and in contact with each of the rollers. The inventive transmission may also comprise a transfer shaft rotatable about the longitudinal axis. The shaft may be rigidly attached to the idler, is capable of axial movement, and transfers power.

Another feature of the invention concerns a variable speed transmission having multiple transfer bearings that contact a transfer axle, are configured to roll axially along an axis parallel to the longitudinal axis, and orbit the longitudinal axis.

In some embodiments, an aspect of the invention is a variable speed transmission comprising a high speed shaft and a low speed shaft, both rotatable about the longitudinal axis, the high speed shaft transferring power at a higher speed than the low speed shaft wherein the high speed shaft contacts the transfer bearings.

In yet other embodiments, the variable speed transmission includes a high speed shaft having a plurality of longitudinal radiused grooves along axes parallel to and radial outward from the longitudinal axis. The transfer bearings may be adapted to fit into the longitudinal grooves of the high speed shaft, each longitudinal groove having a radius slightly larger than the radii of the transfer bearings.

In some embodiments, a variable speed transmission has a transfer shaft that contains a plurality of longitudinal radiused grooves along axes parallel to and radially outward from the longitudinal axis.

Another aspect of the invention relates to variable speed transmission having a longitudinal axis and an idler which is rotatable about the longitudinal axis and which is adapted to transfer power. The transmission may further include a rotatable input disc. The transmission may also have multiple spherical rollers distributed radially about the longitudinal axis, each roller having a tiltable axis about which it rotates. The roller is operationally in frictional contact with the idler and the input disc. Another aspect of the transmission concerns a bearing disc that is rotatable about the longitudinal axis and is adapted to transfer power and absorb axial force. The transmission may also include a bearing disc bearing that is rotatable about the longitudinal axis, and wherein the bearing disc bearing contacts the bearing disc and is able to absorb axial force. Another feature of the transmission relates to a rotatable case mounted about the longitudinal axis, the case being in operable contact with rollers and the bearing disc bearing. In some embodiments, the case is adapted to not transfer power.

In some embodiments, the inventive transmission may include a non-rotating output stator coaxially positioned about the longitudinal axis, the output stator positioned both inside of and outside of the case, the output stator containing at least one aperture located outside of the case, the at least one aperture configured to provide access for shifting the transmission.

In yet other embodiments, the transmission may have a non-rotating brace rigidly attached to the output stator and operably attached to a rigid structure, such as a frame.

Another embodiment of the invention disclosed herein refers to a variable speed transmission having longitudinal axis and several balls distributed radially about the longitudinal axis, each ball having a tiltable axis about which it rotates. The transmission also includes a rotatable input disc positioned adjacent to the balls and in contact with each of the balls. In some embodiments, the transmission additionally comprises an idler rotatable about the longitudinal axis and positioned radially inward of and in contact with each of the balls, the idler capable of transferring power. In some embodiments, the transmission may include a transfer shaft rotatable about the longitudinal axis and able to transfer power, the transfer shaft rigidly attached to the idler and able to move axially. The transmission may also have at least one annular shift bearing able to absorb axial force, positioned coaxially about the longitudinal axis, and able to move axially simultaneously with the transfer shaft and the idler.

In some embodiments, the inventive transmission may have a non-rotating output stator coaxially positioned about the longitudinal axis, the output stator positioned both inside of and outside of the case, the output stator containing at least one aperture located outside of the case, the at least one aperture configured to provide access for shifting the transmission. The inventive transmission may also include at least one shift pin contacting the one shift bearing, and extending through the aperture of the output stator. In other embodiments, the transmission may include a shift ring coaxially positioned about the longitudinal axis, the shift ring attached to the shift pin and able to move axially with the transfer shaft.

In additional embodiments, the invention is directed to a variable speed transmission that has a longitudinal axis and multiple balls distributed radially about the longitudinal axis. Preferably, each ball has a tiltable axis about which it rotates. The transmission may also have an input disc operationally in frictional contact with each of the balls. The transmission may include an idler adapted to transfer power, rotatable about the longitudinal axis, and in contact with each of the balls. The transmission may be configured such that an idler track and an input disc track are equal when negative gamma is one half alpha. Gamma and alpha are described below. In some embodiments, the transmission 600 is configured such that its ratio range is equal to the overdrive ratio of transmission 100 when positive gamma of each transmission is equal. In yet other embodiments, the ratio range of transmission

1800 is equal to the overdrive ratio of transmission 100 when positive gamma of each transmission is equal. In some embodiments, the average speed decrease of transmission 1800 remains the same as positive gamma varies. In some embodiments, the speed increase of transmission 600 equals the radius of the input disc divided by the radius of the idler when negative gamma is one half alpha. In other embodiments, the speed decrease of transmission 1800 equals the radius of the input disc divided by the radius of the idler when negative gamma is one half alpha. In yet other embodiments, the values of negative gamma do not produce as great of a rate of speed change as positive gamma values for the transmission 600.

Another aspect of the inventive transmission concerns a variable speed transmission having a longitudinal axis and balls distributed radially about the longitudinal axis, each ball having a tiltable axis about which it rotates. The transmission includes an input disc, an idler, and an output disc, all configured such that each of the input disc, idler, and output disc are in operational frictional contact with each of the balls. The balls may have textured surfaces formed into their surfaces. A hard, wear resistant coating may be applied to the surfaces of the balls. The height of the textured surface is preferably 1-10 microns thick, and more preferably 0.5-5 microns thick. In some embodiments, the input and output discs also have textured surfaces. In other embodiments, the textured surface increases friction between the balls and one or both of the input and output discs. In yet other embodiments, the idler also has a textured surface. In additional embodiments, the textured surface increases the surface area of the balls. In yet other embodiments, the textured surface increases the mechanical bond between the coating and the substrate.

Yet another aspect of the invention concerns a continuously variable transmission (CVT) having a longitudinal axis and a plurality of balls distributed radially about the longitudinal axis. The CVT can additionally include a rotatable idler in contact with each of, and radially inward of, the balls. The CVT can also be configured such that a first shaft is coupled to the idler, and wherein the plurality of balls, the rotatable idler, and the first shaft are adapted to transmit power.

In one aspect, the invention relates to a shifting apparatus for a continuously variable transmission having a plurality of balls arranged radially about, and supported by, an idler. The shifting apparatus can include a shaft operationally coupled to the idler, and a lever operationally coupled to the shaft such that actuation of the lever causes an axial movement of the shaft.

Another aspect of the invention comprehends a method of operating a continuously variable transmission. The method includes providing an input disc, an output disc, a plurality of balls between and in contact with the input disc and the output disc. The method further includes contacting each of the input disc and the output disc to the balls at an angle alpha, wherein the angle alpha is the angle between a line parallel to a longitudinal axis of the CVT and a line parallel to the line of action at the point of contact between the balls and the input disc. The method can further include providing an idler, positioned radially inward of the balls, wherein the idler is configured to support the balls. In one embodiment, the method can also include configuring the CVT such that the ratio of a radius of the input disc to a radius of the idler is such that an idler track is greater than or equal to an input disc track at all gamma angles, wherein gamma is the angle defined by the tilting of an axis of rotation of the balls relative to a longitudinal axis of the CVT.

In yet another aspect, the invention relates to a wind turbine. In one embodiment, the wind turbine can include a wind turbine rotor coupled to a first shaft, a speed increasing gearbox coupled to the first shaft and to a second shaft, a continuously variable transmission (CVT) coupled to the second shaft and to a third shaft, and a generator coupled to the third shaft. In one embodiment of the wind turbine, the CVT includes an input disc operationally coupled to the second shaft, a plurality of balls driven by the input disc, and an idler configured to be driven by the plurality of the balls. In certain embodiments, the idler is operationally coupled to the third shaft.

These and other improvements will become apparent to those skilled in the art as they read the following detailed description and view the enclosed figures.

BRIEF DESCRIPTION OF THE DRAWINGS

FIG. 14 is a partial schematic view of balls and discs for an embodiment of the transmission of FIG. 9.

FIG. 15 is a partial schematic view of the balls and discs for an embodiment of the transmission of FIG. 9.

FIG. 19 is a chart showing different ratios, e.g., speed increaser ratios from 2.03 to 7.10, for the transmissions of FIGS. 1, 9, and 18.

FIG. 20 is a chart showing different ratios, e.g., speed increaser ratios from 1.97 to 3.87 for the transmissions of FIGS. 1, 9, and 18.

FIG. 22 is a surface profile of the discs, balls, and idler of the transmissions of FIGS. 1, 9, and 18.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The transmissions described herein are of the type that utilize speed adjuster balls with axes that tilt as described in, for example, U.S. Pat. Nos. 6,241,636, 6,322,475, and 6,419,608, and 6,689,012. The embodiments described in these patents and those described herein typically have two sides generally separated by a variator portion, to be described below, an input side and an output side. The driving side of the transmission, which is the side that receives the torque or the rotational force into the transmission, is termed the input side, and the driven side of the transmission, or the side that transfers the torque from the transmission out of the transmission, is termed the output side. An input disc and an output disc are in contact with the speed adjuster balls. As the balls tilt on their axes, the point of rolling contact on one disc moves toward the pole or axis of the ball, where it contacts the ball at a circle of decreasing diameter, and the point of rolling contact on the other disc moves toward the equator of the ball, thus contacting the disc at a circle of increasing diameter. If the axis of the ball is tilted in the opposite direction, the input and output discs respectively experience the converse relationship. In this manner, the ratio of rotational speed of the input disc to that of the output disc, or the transmission ratio, can be changed over a wide range by simply tilting the axes of the speed adjuster balls. The centers of the balls define the border between the input side and the output side of the transmission and similar components that are located on both the input side of the balls and the output side of the balls are generally described herein with the same reference numbers. Similar components located on both the input and output sides of the transmission generally have the suffix "a" attached at the end of the reference number if they are located on the input side, and the components located on the output side of the transmission generally have the suffix "b" attached at the end of their respective reference numbers.

Figure 1:
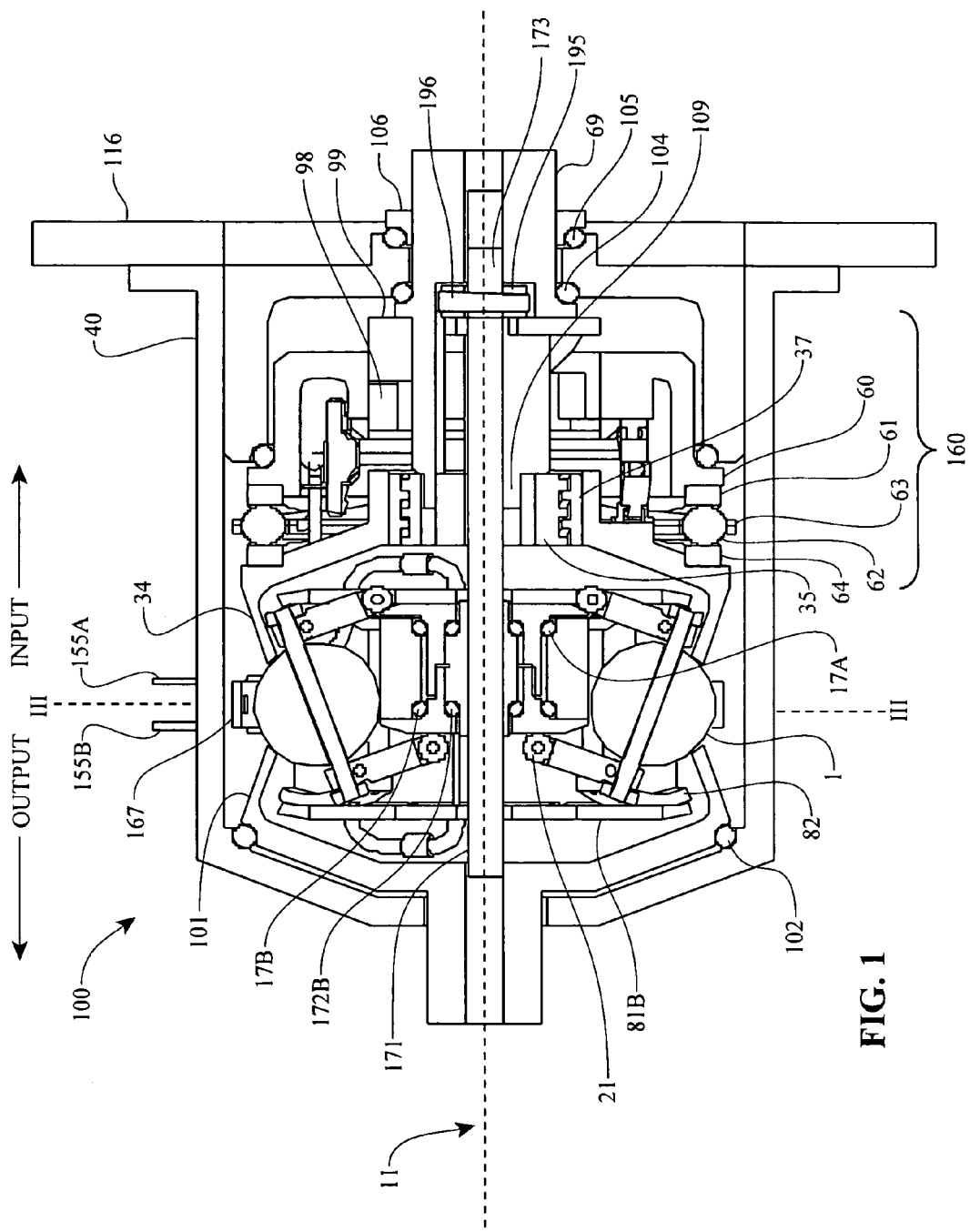
FIG. 1 is a cutaway side view of an embodiment of the transmission shifted into high.
Figure 2:
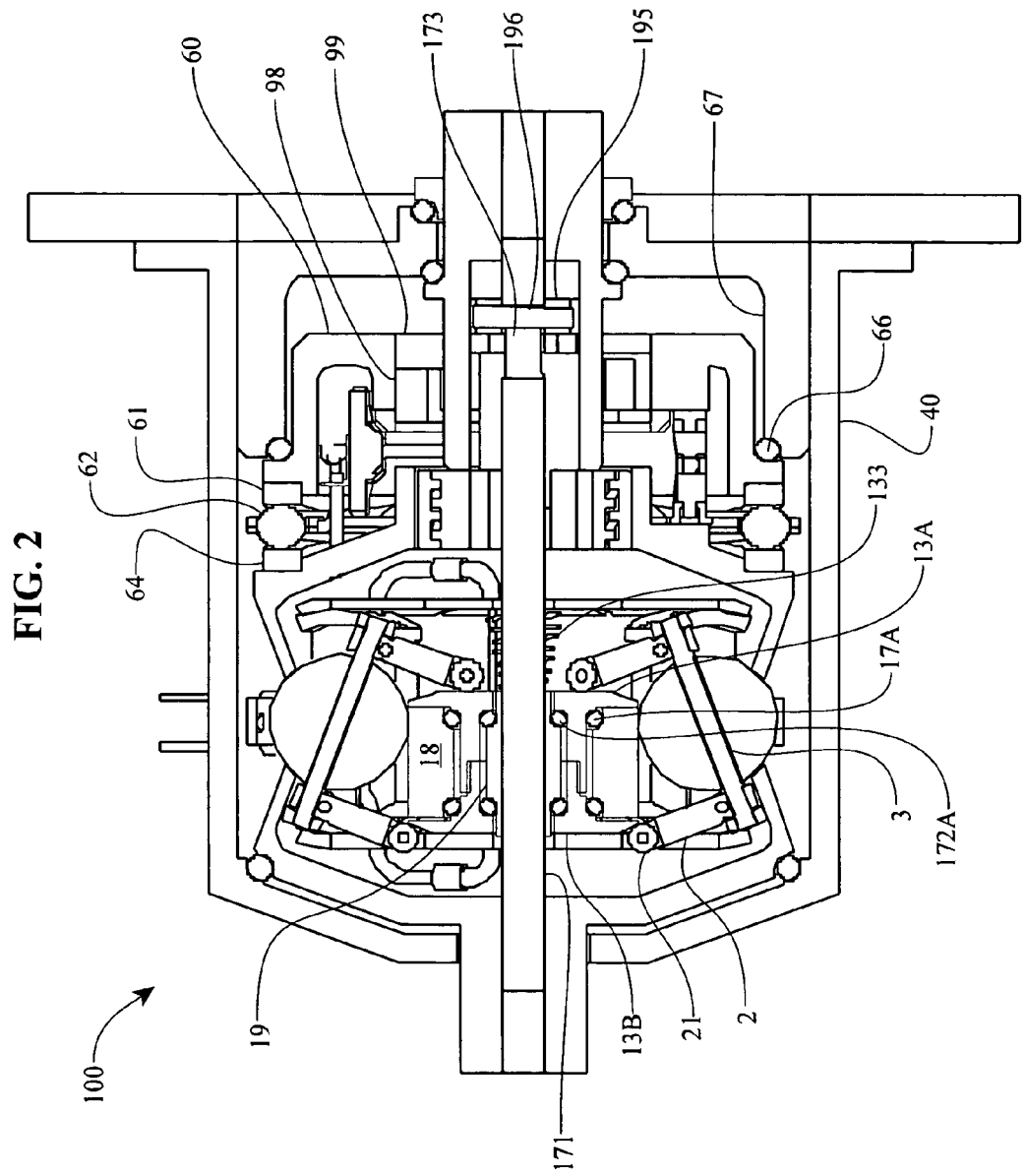
FIG. 2 is a cutaway side view of the transmission of FIG. 1 shifted into low.

Referring to FIGS. 1 and 2, an embodiment of a transmission 100 is illustrated having a longitudinal axis 11 about which multiple speed adjusting balls 1 are radially distributed. The speed adjusting balls 1 of some embodiments stay in their angular positions about the longitudinal axis 11, while in other embodiments the balls 1 are free to orbit about the longitudinal axis 11. The balls 1 are contacted on their input side by an input disc 34 and on their output side by an output disc 101. The input and output discs 34, 101 are annular discs extending from an inner bore near the longitudinal axis 11 on their respective input and output sides of the balls 1 to a radial point at which they each make contact with the balls 1. The input and output discs 34, 101 each have a contact surface that forms the contact area between each disc 34 and 101, and the balls 1. In general, as the input disc 34 rotates about the longitudinal axis 11, each portion of the contact area of the input disc 34 rotates and sequentially contacts each of the balls 1 during each rotation. This is similar for the output disc 101 as well.

The input disc 34 and the output disc 101 can be shaped as simple discs or can be concave, convex, and cylindrical or any other shape, depending on the configuration of the input and output desired. In one embodiment the input and output discs are spoked to make them lighter for weight sensitive applications. The rolling contact surfaces of the discs where they engage the speed adjuster balls can have a flat, concave, convex, or other shaped profile, depending on the torque and efficiency requirements of the application. A concave profile where the discs contact the balls decreases the amount of axial force required to prevent slippage while a convex profile increases efficiency.

Additionally, the balls 1 all contact an idler 18 on their respective radially innermost point. The idler 18 is a generally cylindrical component that rests coaxially about the longitudinal axis 11 and assists in maintaining the radial position of the balls 1. With reference to the longitudinal axis 11 of many embodiments of the transmission, the contact surfaces of the input disc 34 and the output disc 101 can be located generally radially outward from the center of the balls 1, with the idler 18 located radially inward from the balls 1, so that each ball 1 makes three-point contact with the idler 18, the input disc 34, and the output disc 101. The input disc 34, the output disc 101, and the idler 18 can all rotate about the same longitudinal axis 11 in many embodiments, and are described in fuller detail below.

Due to the fact that the embodiments of transmissions 100 described herein are rolling traction transmissions, in some embodiments, high axial forces are required to prevent slippage of the input disc 34 and output disc 101 at the ball 1 contacts. As axial force increases during periods of high torque transfer, deformation of the contact patches where the input disc 34, the output disc 101, and the idler 18 contact the balls 1 becomes a significant problem, reducing efficiency and the life of these components. The amount of torque that can be transferred through these contact patches is finite and is a function of the yield strength of the material from which the balls 1, the input disc, 34, the output disc 101, and the idler 18 are made. The friction coefficient of the balls 1, the input disc, 34, the output disc 101, and the idler 18 has a dramatic effect on the amount of axial force required to transfer a given amount of torque and thus greatly affects the efficiency and life of the transmission. The friction coefficient of the rolling elements in a traction transmission is a very important variable affecting performance.

Certain coatings may be applied to the surfaces of the balls 1, the input disc, 34, the output disc 101, and the idler 18 to improve their performance. In fact, such coatings can be used advantageously on the rolling contacting elements of any rolling traction transmission to achieve the same added benefits that are achieved for the embodiments of transmissions described herein. Some coatings have the beneficial effect of increasing the friction coefficient of the surfaces of these rolling elements. Some coatings have a high friction coefficient and also display a variable coefficient of friction, which increases as axial force increases. A high friction coefficient allows less axial force to be required for a given torque, thereby increasing efficiency and life of the transmission. A variable coefficient of friction increases the maximum torque rating of the transmission by decreasing the amount of axial force required to transfer this maximum torque.

Some coatings, such as ceramics and cermets, possess excellent hardness and wear properties, and can greatly extend the life of the highly loaded rolling elements in a rolling traction transmission. A ceramic coating such as silicon nitride can have a high friction coefficient, a variable coefficient of friction which increases as axial force increases, and can also increase the life of the balls 1, the input disc, 34, the output disc 101, and the idler 18 when applied to the surfaces of these components in a very thin layer. The coating thickness depends on the material used for the coating and can vary from application to application but typically is in the range of 0.5 microns to 2 microns for a ceramic and 0.75 microns to 4 microns for a cermet.

The process used to apply the coating is important to consider when the balls 1, the input disc, 34, the output disc 101, and the idler 18 are made from hardened steel, which is the material used in many embodiments of the transmissions described herein. Some processes used to apply ceramics and cermets require high temperatures and will lower the hardness of the balls 1, the input disc, 34, the output disc 101, and the idler 18, harming performance and contributing to premature failure. A low temperature application process is desirable and several are available, including low temperature vacuum plasma, DC pulsed reactive magnetron sputtering, plasma-enhanced chemical vapor deposition (PE-CVD), unbalanced magnetron physical vapor deposition, and plating. The plating process is attractive due to its low cost and because a custom bath can be created to achieve desired coating properties. Immersing the rolling elements in a bath of silicon carbide or silicon nitride with co-deposited electroless nickel or electroplated nickel with silicon carbide or silicon nitride is a low temperature solution that is well suited for high volume production. It should be noted that other materials can be used in addition to those mentioned. With this application process, the parts are contained in a cage, immersed in the bath, and shaken so that the solution contacts all surfaces. Thickness of the coating is controlled by the length of time that the components are immersed in the bath. For instance, some embodiments will soak the components using silicon nitride with co-deposited electroless nickel for four (4) hours to achieve the proper coating thickness, although this is just an example and many ways to form the coating and control its thickness are known and can be used taking into account the desired properties, the desired thickness and the substrate or base metal of which the components are made.

Figure 3:
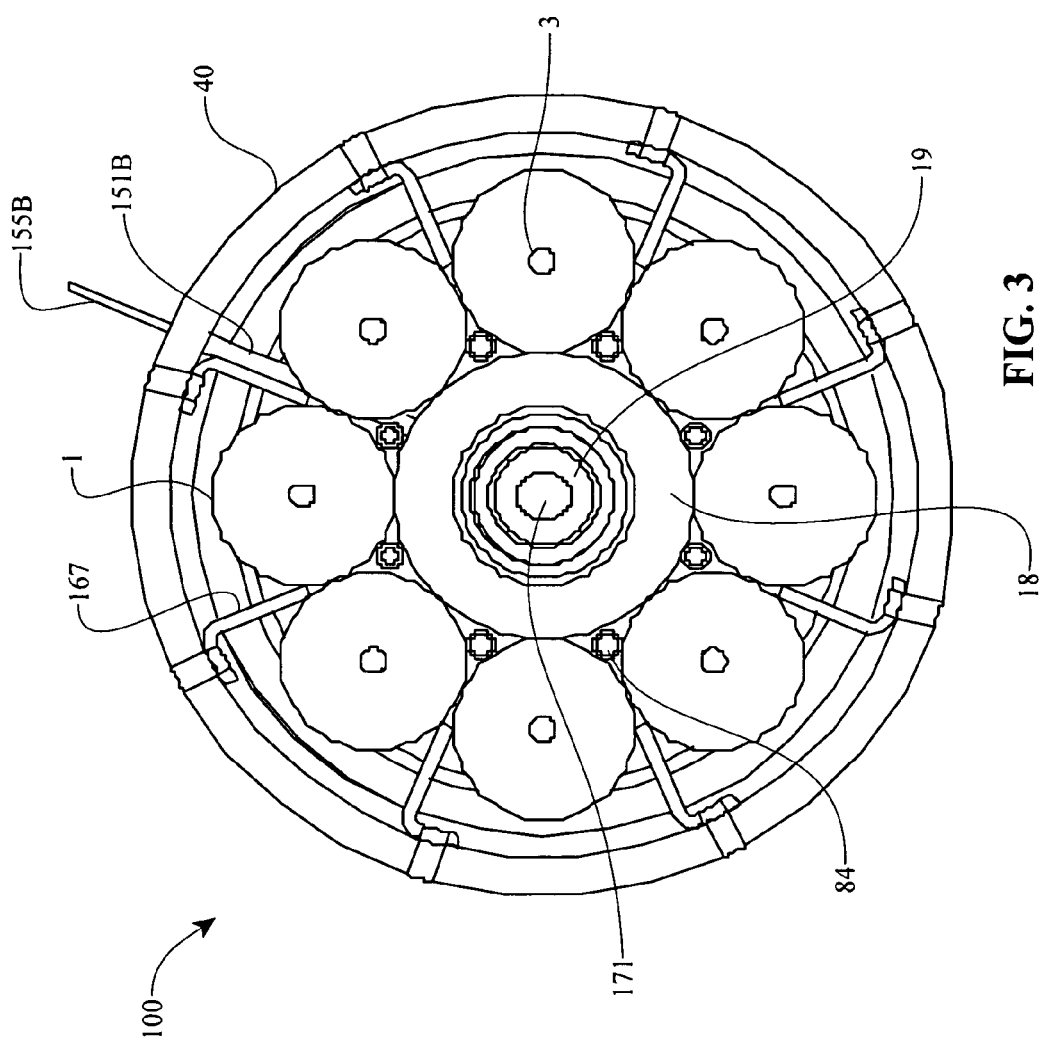
FIG. 3 is a partial end cross-sectional view of the transmission taken on line III-III of FIG. 1.

FIGS. 1, 2, and 3 illustrate an embodiment of a continuously variable transmission 100 that is shrouded in a case 40 which protects the transmission 100, contains lubricant, aligns components of the transmission 100, and absorbs forces of the transmission 100. A case cap 67 can, in certain embodiments, cover the case 40. The case cap 67 is generally shaped as a disc with a bore through its center through which an input shaft passes. The case cap 67 has a set of threads at its outer diameter that thread into a corresponding set of threads on the inner diameter of the case 40. Although in other embodiments, the case cap 67 can be fastened to the case 40 or held in place by a snap ring and corresponding groove in the case 40, and would therefore not need to be threaded at its outer diameter. In embodiments utilizing fasteners to attach the case cap 67, the case cap 67 extends to the inside diameter of the case 40 so that case fasteners (not shown) used to bolt the case 40 to the machinery to which the transmission 100 is attached can be passed through corresponding holes in the case cap 67. The case cap 67 of the illustrated embodiment has a cylindrical portion extending from an area near its outer diameter toward the output side of the transmission 100 for additional support of other components of the transmission 100.

At the heart of the illustrated transmission 100 embodiment is a plurality of balls 1 that are typically spherical in shape and are radially distributed substantially evenly or symmetrically about the centerline, or longitudinal axis 11 of rotation of the transmission 100. In the illustrated embodiment, eight balls 1 are used. However, it should be noted that more or fewer balls 1 could be used depending on the use of the transmission 100. For example, the transmission may include 3, 4, 5, 6, 7, 8, 9, 10, 11, 12, 13, 14, 15, or more balls. The provision for more than 3, 4, or 5 balls can more widely distribute the forces exerted on the individual balls 1 and their points of contact with other components of the transmission 100 and can also reduce the force necessary to prevent the transmission 100 from slipping at the ball 1 contact patches. Certain embodiments in applications with low torque but a high transmission ratio use few balls 1 of relatively larger diameters, while certain embodiments in applications with high torque and a high transmission ratio can use more balls 1 or relatively larger diameters. Other embodiments, in applications with high torque and a low transmission ratio and where high efficiency is not important, use more balls 1 of relatively smaller diameters. Finally, certain embodiments, in applications with low torque and where high efficiency is not important, use few balls 1 of relatively smaller diameters.

Ball axles 3 are inserted through holes that run through the center of each of the balls 1 to define an axis of rotation for each of the balls 1. The ball axles 3 are generally elongated shafts over which the balls 1 rotate, and have two ends that extend out of either side of the hole through the balls 1. Certain embodiments have cylindrically shaped ball axles 3, although any shape can be used. The balls 1 are mounted to freely rotate about the ball axles 3.

In certain embodiments, bearings (not separately illustrated) are utilized to reduce the friction between the outer surface of the ball axles 3 and the surface of the bore through the corresponding ball 1. These bearings can be any type of bearings situated anywhere along the contacting surfaces of the balls 1 and their corresponding ball axles 3, and many embodiments will maximize the life and utility of such bearings through standard mechanical principles common in the design of dynamic mechanical systems. In some of these embodiments, radial bearings are located at each end of the bore through the balls 1. These bearings can incorporate the inner surface of the bore or the outer surface of the ball axles 3 as their races, or the bearings can include separate races that fit in appropriate cavities formed in the bore of each ball 1 and on each ball axle 3. In one embodiment, a cavity (not shown) for a bearing is formed by expanding the bore through each ball 1 at least at both ends an appropriate diameter such that a radial bearing, roller, ball or other type, can be fitted into and held within the cavity thus formed. In another embodiment, the ball axles 3 are coated with a friction reducing material such as babbit, Teflon or other such material.

Many embodiments also minimize the friction between the ball axles 3 and the balls 1 by introducing lubrication in the bore of the ball axles 3. The lubrication can be injected into the bore around the ball axles 3 by a pressure source, or it can be drawn into the bore by the rifling or helical grooves formed on the ball axles 3 themselves. Further discussion of the lubrication of the ball axles 3 is provided below.

In FIG. 1, the axes of rotation of the balls 1 are shown tilted in a direction that puts the transmission in a high ratio, wherein the output speed is greater than the input speed. If the ball axles 3 are horizontal, that is parallel to the main axis of the transmission 100, the transmission 100 is in a 1:1 input rotation rate to output rotation rate ratio, wherein the input and output rotation speeds are equal. In FIG. 2, the axes of rotation of the balls 1 are shown tilted in a direction where the transmission 100 is in a low ratio, meaning the output rotation speed is slower than the input rotation speed. For the purpose of simplicity, only the parts that change position or orientation when the transmission 100 is shifted are numbered in FIG. 2.

Figure 4:
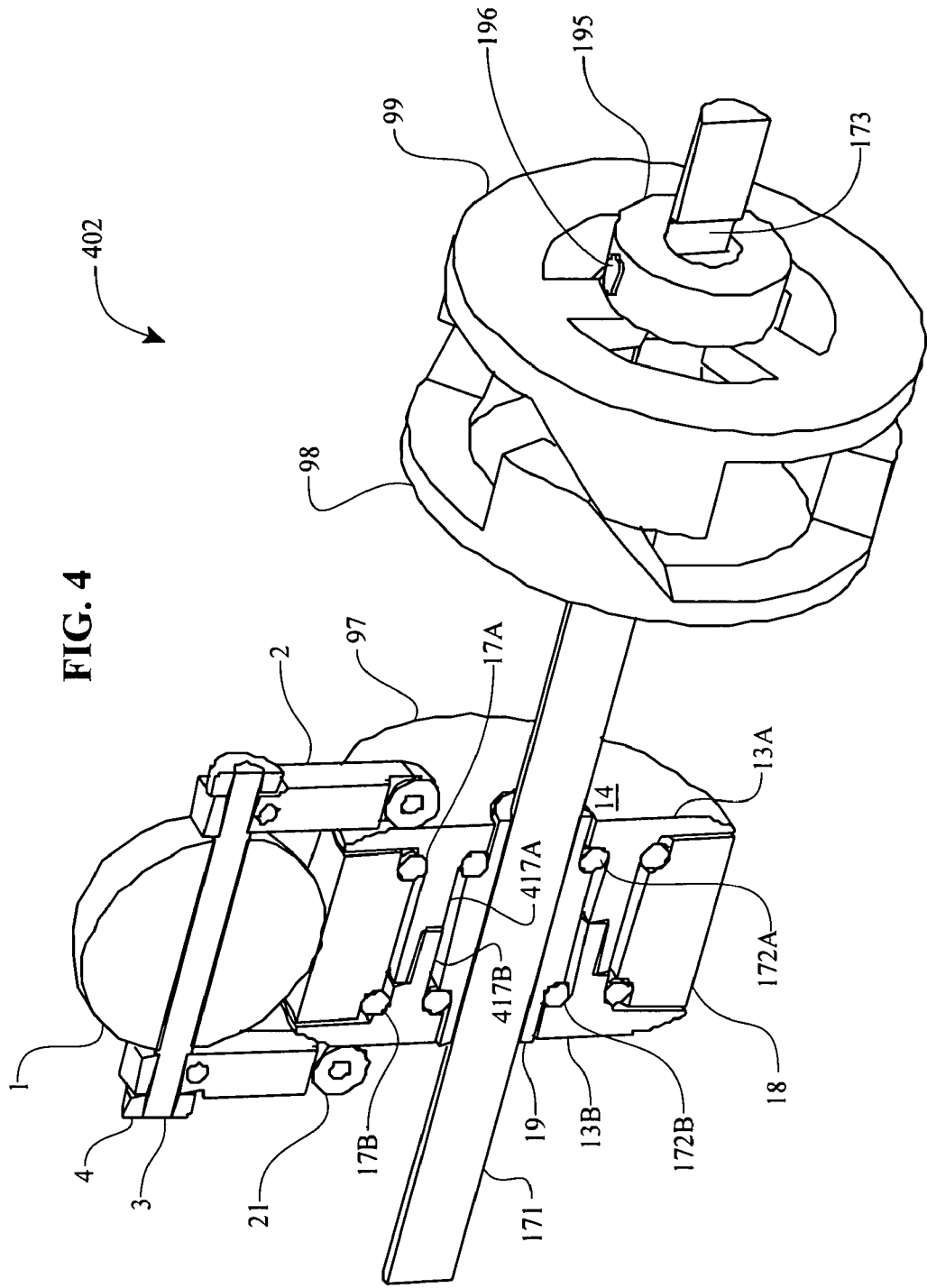
FIG. 4 is a schematic cutaway side view of the idler and ramp sub-assembly of the transmission of FIG. 1.
Figure 5:
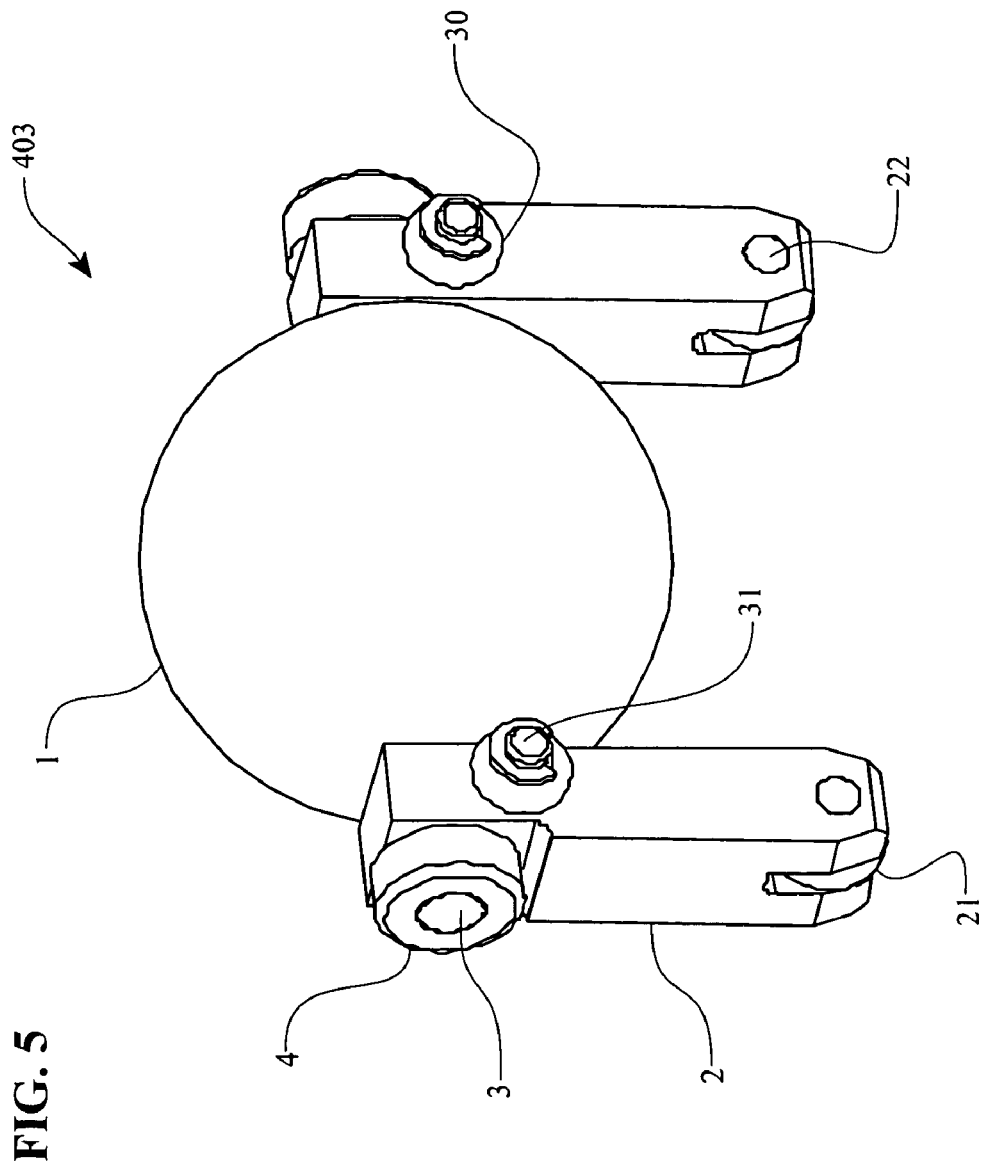
FIG. 5 is a schematic perspective view of the ball sub-assembly of the transmission of FIG. 1.
Figure 7:
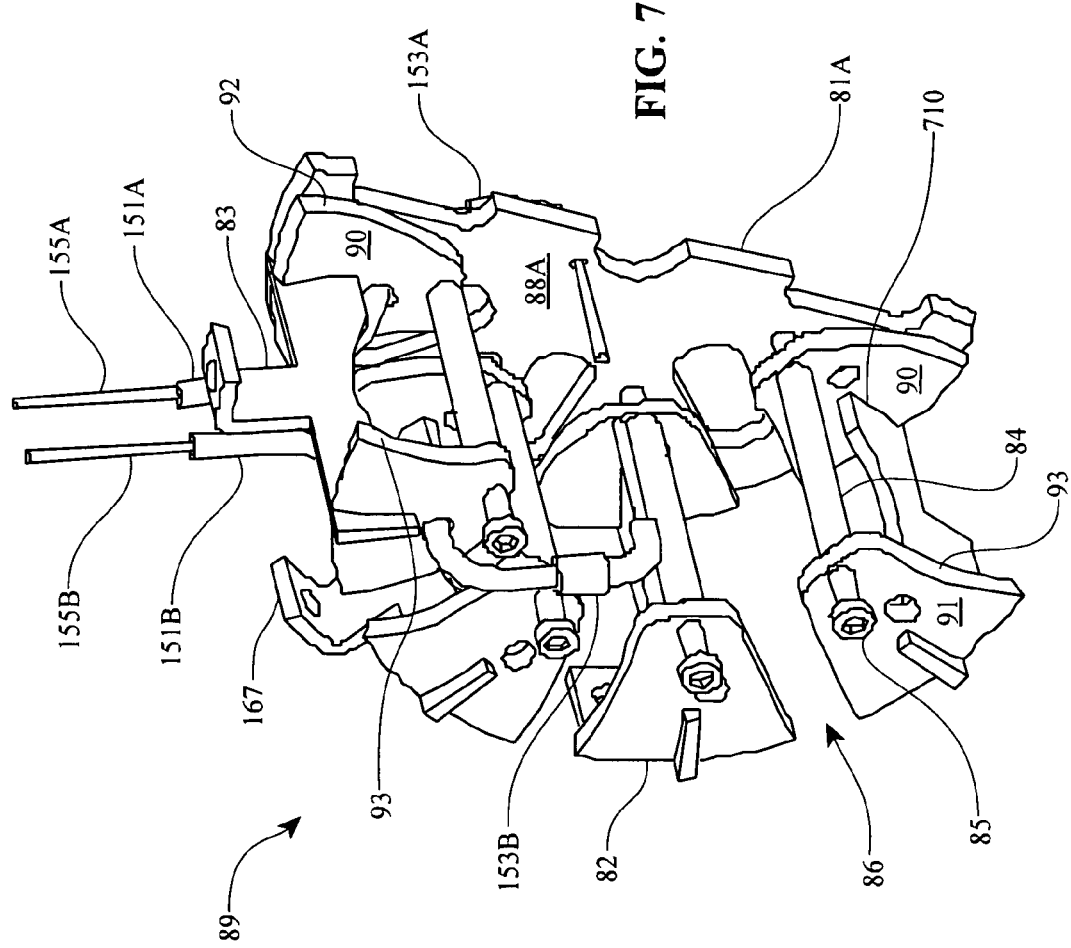
FIG. 7 is a schematic cutaway side view of the cage sub-assembly of the transmission of FIG. 1.

FIGS. 1, 2, 4, and 5 illustrate how the axes of the balls 1 can be tilted in operation to shift the transmission 100. Referring to FIG. 5, a plurality of legs 2, which in most embodiments are generally struts, are attached to the ball axles 3 near each of the ends of the ball axles 3 that extend beyond the ends of the holes bored through the balls 1. Each leg 2 extends from its point of attachment to its respective ball axle 3 radially inward toward the axis of the transmission 100. In one embodiment, each of the legs 2 has a through bore that receives a respective end of one of the ball axles 3. The ball axles 3 preferably extend through the legs 2 such that they have an end exposed beyond each leg 2. In the illustrated embodiments, the ball axles 3 advantageously have rollers 4 coaxially and slidingly positioned over the exposed ends of the ball axles 3. The rollers 4 are generally cylindrical wheels fitted over the ball axles 3 outside of and beyond the legs 2 and rotate freely about the ball axles 3. The rollers 4 can be attached to the ball axles 3 via spring clips or other such mechanism, or they can ride freely over the ball axles 3. The rollers 4 can be radial bearings for instance, where the outer races of the bearings form the wheel or rolling surface. As illustrated in FIGS. 1 and 7, the rollers 4 and the ends of the ball axles 3 fit inside grooves 86 formed by or in a pair of stators 80a, 80b.

The stators 80a, 80b of one embodiment are illustrated in FIGS. 5 and 7. The illustrated input stator 80a and output stator 80b are generally in the form of parallel discs annularly located about the longitudinal axis 11 of the transmission on either side of the balls 1. The stators 80a, 80b of many embodiments are comprised of input stator discs 81a and output stator discs 81b, respectively, which are generally annular discs of substantially uniform thickness with multiple apertures to be discussed further below. Each input and output stator disc 81a, 81b has a first side that faces the balls 1 and a second side that faces away from the balls 1. Multiple stator curves 82 are attached to the first side of the stator discs 81a, 81b. The stator curves 82 are curved surfaces attached or affixed to the stator discs 81a, 81b that each have a concave face 90 facing toward the balls 1 and a convex face 91 facing away from the balls 1 and contacting their respective stator discs 81. In some embodiments, the stator curves 82 are integral with the stator discs 81a, 81b. The stator curves 82 of many embodiments have a substantially uniform thickness and have at least one aperture (not separately shown) used to align and attach the stator curves 82 to each other and to the stator discs 81. The stator curves 82 of many embodiments, or the stator discs 81a, 81b where integral parts are used, include a slot 710 that accepts a flat spacer 83, which allows further positioning and alignment of the stator curves 82 and stator discs 81a, 81b. The flat spacers 83 are generally flat and generally rectangular pieces of rigid material that extend between and interconnect the input stator 80a and the output stator 80b. The flat spacers 83 fit within the slots 710 formed in the stator curves 82. In the illustrated embodiment, the flat spacers 83 are not fastened or otherwise connected to the stator curves 82; however, in some embodiments the flat spacers 83 are attached to the stator curves 82 by welding, adhesive, or fastening.

Also illustrated in FIG. 7, multiple cylindrical spacers 84, of a generally cylindrical shape with bores at least in each end, are radially positioned inside of the flat spacers 83 and also connect and position the stator discs 81 and stator curves 82.

The bores of the cylindrical spacers 84 accept one spacer fastener 85 at each end. The spacer fasteners 85 are designed to clamp and hold the stator discs 81a, 81b, the stator curves 82, the flat spacers 83, and the cylindrical spacers 84 together, which collectively form the cage 89. The cage 89 maintains the radial and angular positions of the balls 1 and aligns the balls 1 with respect to one another.

The rotational axes of the balls 1 are changed by moving either the input-side or output-side legs 2 radially out from the axis of the transmission 100, which tilts the ball axles 3. As this occurs, each roller 4 fits into and follows a groove 86, which is slightly larger than the diameter of the roller 4, and is formed by the space between each pair of adjacent stator curves 82. The rollers 4 therefore roll along the surface of the sides 92, 93 of the stator curves 82, a first side 92 and a second side 93 for each stator curve 82, in order to maintain the plane of movement of the ball axles 3 in line with the longitudinal axis 11 of the transmission 100. In many embodiments, each roller 4 rolls on a first side 92 of the stator curve 82 on the input side of the transmission 100 and on the corresponding first side 92 of the corresponding output stator curve 82. Typically in such embodiments, the forces of the transmission 100 prevent the rollers 4 from contacting the second side 93 of the stator curves 82 in normal operation. The rollers 4 are slightly smaller in diameter than the width of the grooves 86, forming a small gap between the edges of the grooves 86 and the circumference of each corresponding roller.

If the opposing sets of stator curves 82 on the input stator 80a and output stator 80b were in perfect alignment, the small gap between the circumferences of the rollers 4 and the grooves 86 would allow the ball axles to slightly tilt and become misaligned with the longitudinal axis 11 of the transmission 100. This condition produces sideslip, a situation where the balls axles 3 are allowed to slightly move laterally, which lowers overall transmission efficiency. In some embodiments, the stator curves 82 on the input and output sides of the transmission 100 may be slightly offset from each other so that the ball axles 3 remain parallel with the axis of the transmission 100. Any tangential force, mainly a transaxial force, the balls 1 may apply to the ball axles 3 is absorbed by the ball axles 3, the rollers 4 and the first sides 92, 93. As the transmission 100 is shifted to a lower or higher transmission ratio by changing the rotational axes of the balls 1, each one of the pairs of rollers 4, located on the opposite ends of a single ball axle 3, move in opposite directions along their respective corresponding grooves 86 by rolling up or down a respective side of the groove 86.

Referring to FIGS. 1 and 7, the cage 89 can be rigidly attached to the case 40 with one or more case connectors 167. The case connectors 167 extend generally perpendicularly from the radial outermost part of the flat spacers 83. The case connectors 167 can be fastened to the flat spacers 83 or can be formed integrally with the flat spacers 83. The outside diameter formed roughly by the outsides of the case connectors 167 is substantially the same dimension as the inside diameter of the case 40 and holes in both the case 40 and case connectors 167 provide for the use of standard or specialty fasteners, which rigidly attach the case connectors 167 to the case 40, thus bracing and preventing the cage 40 from moving. The case 40 has mounting holes providing for the attachment of the case 40 to a frame or other structural body. In other embodiments, the case connectors 167 can be formed as part of the case 40 and provide a location for attachment of the flat spacers 83 or other cage 89 component in order to immobilize the cage 89.

FIGS. 1, 5, and 7 illustrate an embodiment including a pair of stator wheels 30 attached to each of the legs 2 that roll on the concave face 90 of the curved surfaces 82 along a path near the edge of the sides 92, 93. The stator wheels 30 are attached to the legs 2 generally in the area where the ball axles 3 pass through the legs 2. The stator wheels 30 can be attached to the legs 2 with stator wheel pins 31, which pass through a bore through the legs 2 that is generally perpendicular to the ball axles 3, or by any other attachment method. The stator wheels 30 are coaxially and slidingly mounted over the stator wheel pins 31 and secured with standard fasteners, such as snap rings for example. In some embodiments, the stator wheels 30 are radial bearings with the inner race mounted to the stator wheel pins 31 and the outer race forming the rolling surface. In certain embodiments, one stator wheel 30 is positioned on each side of a leg 2 with enough clearance from the leg 2 to allow the stator wheels 30 to roll radially along the concave faces 90, with respect to the longitudinal axis 11, when the transmission 100 is shifted. In certain embodiments, the concave faces 90 are shaped such that they are concentric about a radius from the longitudinal axis 11 formed by the center of the balls 1.

Still referring to FIGS. 1, 5, and 7, guide wheels 21 are illustrated that can be attached to the end of the legs 2 that are nearest the longitudinal axis 11. In the illustrated embodiment, the guide wheels 21 are inserted into a slot formed in the end of the legs 2. The guide wheels 21 are held in place in the slots of the legs 21 with guide wheel pins 22, or by any other attachment method. The guide wheels 21 are coaxially and slidingly mounted over the guide wheel pins 22, which are inserted into bores formed in the legs 2 on each side of the guide wheels 21 and perpendicular to the plane of the slot. In some embodiments, the legs 2 are designed to elastically deflect relatively slightly in order to allow for manufacturing tolerances of the parts of the transmission 100. The ball 1, the legs 2, the ball axle 3, the rollers 4, the stator wheels 30, the stator wheel pins 31, the guide wheels 21, and the guide wheel pins 22 collectively form the ball/leg assembly 403 seen in FIG. 5.

Figure 6:
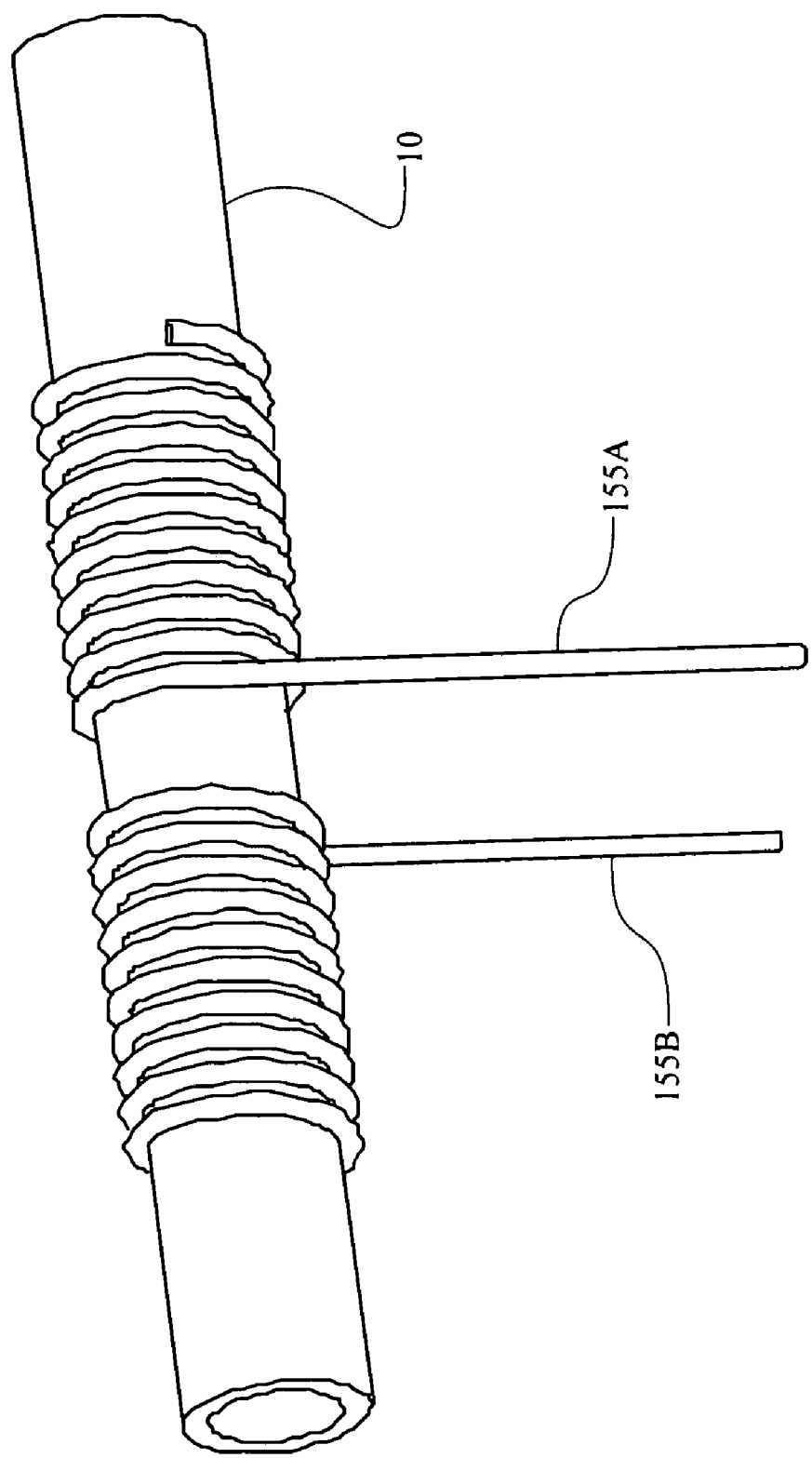
FIG. 6 is a schematic view of the shift rod sub-assembly of the transmission of FIG. 1.

Referring to the embodiment illustrated in FIGS. 4, 6, and 7, shifting is actuated by rotating a rod 10 that is positioned outside of the case 40. The rod 10 is utilized to wrap an unwrap a flexible input cable 155a and a flexible output cable 155b that are attached to, at their respective first ends, and wrapped around the rod 10, in opposite respective directions. In some embodiments, the input cable 155a is wrapped counter-clockwise around the rod 10 and the output cable 155b is wrapped clockwise around the rod 10, when looking from right to left as the rod 10 is illustrated in FIG. 6. Both the input cable 155a and the output cable 155b extend through holes in the case 40 and then through the first end of an input flexible cable housing 151a, and an output flexible cable housing 151b. The input flexible cable housing 151a and the output flexible cable housing 151b of the illustrated embodiment are flexible, elongated tubes that guide the input cable 155a and output cable 155b radially inward toward the longitudinal axis 11, then longitudinally out through holes in the stator discs 81a, 81b, and then again radially inward where the second end of the input and output flexible cable housings 151a, 151b are inserted into and attach to the first end of input and output rigid cable housings 153a, 153b, respectively.

The input and output rigid cable housings 153a, 153b, are inflexible tubes through which the cables 155a, 155b pass and are guided radially inward from the second ends of the flexible cable housings 151a, 151b and then direct the cables 155a, 155b longitudinally through holes in the stator discs 81a, 81b and toward a second end of the rigid cable housings 153a, 153b near the idler 18. In many embodiments, the cables 155a, 155b are attached at their second ends to an input shift guide 13a, and an output shift guide 13b (described further below) with conventional cable fasteners, or other suitable attachment means. As will be discussed further below, the shift guides 13a, 13b position the idler 18 axially along the longitudinal axis 11 and position the legs 3 radially, thereby changing the axes of the balls 1 and the ratio of the transmission 100.

If the rod 10 is rotated counter-clockwise, relative to the axis of the rod 10 from right to left as illustrated in FIG. 6, by the user, either manually or assisted with a power source, the input cable 155a unwinds from the rod 10 and the output cable 155b winds onto the rod 10. Therefore, the second end of the output cable 155b applies a tension force to the output shift guide 13b and the input cable 155a is unwinding a commensurate amount from the rod 10. This moves the idler 18 axially toward the output side of the transmission 100 and shifts the transmission 100 toward low.

Still referring to FIGS. 4, 5, and 7, the illustrated shift guides 13a, 13b, are each generally of the form of an annular ring with inside and outside diameters, and are shaped so as to have two sides. The first side is a generally straight surface that dynamically contacts and axially supports the idler 18 via two sets of idler bearings 17a, 17b, which are each associated with a respective shift guide 13a, 13b. The second side of each shift guide 13a, 13b, the side facing away from the idler 18, is a cam side that transitions from a straight or flat radial surface 14, towards the inner diameter of the shift guides 13a, 13b, to a convex curve 97 towards the outer diameter of the shift guides 13a, 13b. At the inner diameter of the shift guides 13a, 13b a longitudinal tubular sleeve 417a, 417b extends axially toward the opposing shift guide 13a, 13b in order to mate with the tubular sleeve 417a, 417b from that shift guide 13a, 13b. In some embodiments, as illustrated in FIG. 4, the tubular sleeve 417a of the input side shift guide 13a has part of its inner diameter bored out to accept the tubular sleeve 417b of the output shift guide 13b. Correspondingly, a portion of the outer diameter of the tubular sleeve 417b has been removed to allow a portion of that tubular sleeve 417a to be inserted into the tubular sleeve 417b, and vice versa. This provides additional stability to the shift guides 13a, 13b of such embodiments.

The cross section side view of the shift guides 13a, 13b illustrated in FIG. 4 shows that, in this embodiment, the flat surface 14 profile of the side facing away from the is perpendicular to the longitudinal axis 11 up to a radial point where the guide wheels 21 contact the shift guides 13a, 13b, if the ball axles 3 are parallel with the longitudinal axis 11. From this point moving out toward the perimeter of the shift guide 13a, 13b, the profile of the shift guides 13a, 13b curves in a convex shape. In some embodiments, the convex curve 97 of a shift guide 13a, 13b is not a radius but is composed of multiple radii, or is shaped hyperbolically, asymptotically or otherwise. As the transmission 100 is shifted toward low, the input guide wheels 21a roll toward the longitudinal axis 11 on the flat portion 14 of shift guide 13a, and the output guide wheels 21b roll on the convex curved 97 portion of the shift guide 13b away from the longitudinal axis 11. The shift guides 13a, 13b, can be attached to each other by either threading the tubular sleeve of the input shift guide 13a with male threads and the tubular sleeve of the output sleeve 13b with female threads, or vice versa, and threading the shift guides 13a, 13b, together. One shift guide 13a, 13b, either the input or output, can also be pressed into the other shift guide 13a, 13b. The shift guides 13a, 13b can also be attached by other methods such as glue, metal adhesive, welding or any other means.

The convex curves 97 of the two shift guides 13a, 13b, act as cam surfaces, each contacting and pushing the multiple guide wheels 21. The flat surface 14 and convex curve 97 of each shift guide 13a, 13b contact the guide wheels 21 so that as the shift guides 13a, 13b, move axially along the longitudinal axis 11, the guide wheels 21 ride along the shift guide 13a, 13b surface 14, 97 in a generally radial direction forcing the leg 2 radially out from, or in toward, the longitudinal axis 11, thereby changing the angle of the ball axle 3 and the rotational axis of the associated ball 1.

Referring to FIGS. 4 and 7, the idler 18 of some embodiments is located in a trough formed between the first sides and the sleeve portions of the shift guides 13a, 13b, and thus moves in unison with the shift guides 13a, 13b. In certain embodiments, the idler 18 is generally tubular and of one outside diameter and is substantially cylindrical along the central portion of its inside diameter with an input and output idler bearing 17a, 17b, on each end of its inside diameter. In other embodiments, the outer diameter and inside diameters of the idler 18 can be non-uniform and can vary or be any shape, such as ramped or curved. The idler 18 has two sides, one near the input stator 80a, and one near the output stator 80b.

The idler bearings 17a, 17b provide rolling contact between the idler 18 and the shift guides 13a, 13b. The idler bearings 17a, 17b are located coaxially around the sleeve portion of the shift guides 13a, 13b, allowing the idler 18 to freely rotate about the axis of the transmission 100. A sleeve 19 is fit around the longitudinal axis 11 and fitting inside the inside diameters of the shift guides 13a, 13b. The sleeve 19 is a generally tubular component that is held in operable contact with an inside bearing race surface of each of the shift guides 13a, 13b by an input sleeve bearing 172a and an output sleeve bearing 172b. The sleeve bearings 172a, 172b, provide for rotation of the sleeve 19 by rolling along an outer bearing race complimentary to the races of the shift guides 13a, 13b. The idler 18, the idler bearings 17a, 17b, the sleeve 19, the shift guides 13a, 13b, and the sleeve bearings 172a, 172b collectively form the idler assembly 402, seen in FIG. 4.

Figure 8:
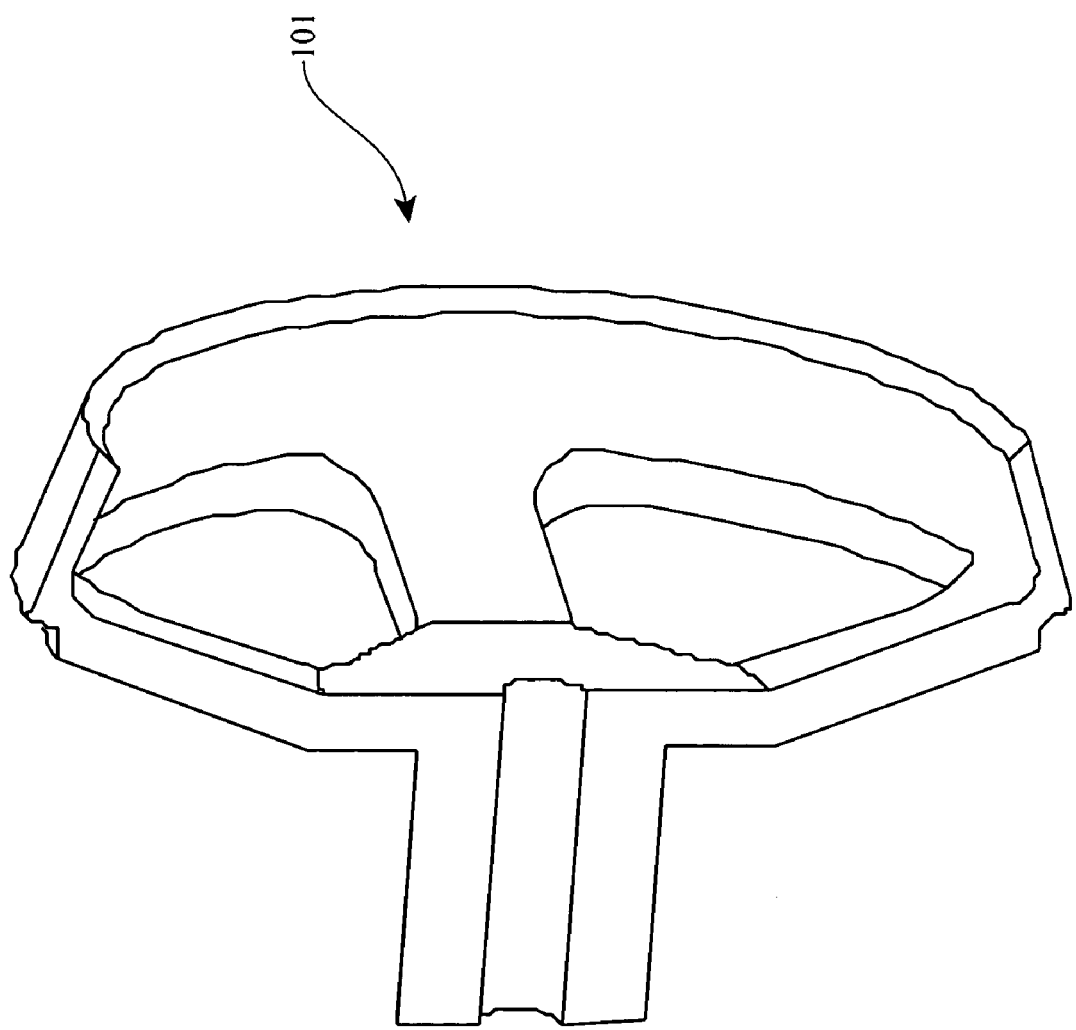
FIG. 8 is a cutaway side view of the output disc of the transmission of FIG. 1.

Referring to FIGS. 4, 7, and 8, the sleeve 19 of some embodiments has its inside diameter threaded to accept the threaded insertion of an idler rod 171. The idler rod 171 is a generally cylindrical rod that lies along the longitudinal axis 11. In some embodiments, the idler rod 171 is threaded at least partially along its length to allow insertion into the sleeve 19. The first end of the idler rod 171, which faces the output side of the transmission 100, is preferably threaded through the sleeve 19 and extends out past the output side of the sleeve 19 where it is inserted into the inside diameter of the output disc 101.

As illustrated in FIG. 8, the output disc 101 in some embodiments is generally a conical disc that is spoked to reduce weight and has a tubular sleeve portion extending from its inner diameter axially toward the output side of the transmission 100. The output disc 101 transfers the output torque to a drive shaft, wheel, or other mechanical device. The output disc 101 contacts the balls 1 on their output side and rotates at a speed different than the input rotation of the transmission at ratios other than 1:1. The output disc 101 serves to guide and center the idler rod 171 at its first end so that the sleeve 19, idler 18, and shift guides 13a, 13b stay concentric with the axis of the transmission 100. Alternately, an annular bearing (not shown) may be positioned over the idler rod 171, between the idler rod 171 and the inside diameter of the output disc 101, to minimize friction. The idler rod 171, sleeve 19, shift guides 13a, 13b, and idler 18 are operably connected, and all move axially in unison when the transmission 100 is shifted.

Referring to FIG. 2, a conical spring 133, positioned between the input shift guide 13a and stator 80a biases the shifting of the transmission 100 toward low. Referring to FIG. 1, output disc bearings 102, which contact a bearing race near the perimeter of the output disc 101, absorb and transfer axial force generated by the transmission 100 to the case 40. The case 40 has a corresponding bearing race to guide the output disc bearings 102.

Referring to FIGS. 4, 5, and 7, the limits of the axial movement of the shift guides 13a, 13b define the shifting range of the transmission 100. Axial movement is limited by inside faces 88a, 88b, on the stator discs 81a, 81b, which the shift guides 13a, 13b, contact. At an extreme high transmission ratio, shift guide 13a contacts the inside face 88a on the input stator disc 81a, and at an extreme low transmission ratio, the shift guide 13b contacts the inside face 88b on the output stator disc 81b. In many embodiments, the curvature of the convex curves 97 of the shift guides 13a, 13b, is functionally dependent on the distance from the center of a ball 1 to the center of the guide wheel 21, the radius of the guide wheel 21, the angle between lines formed between the two guide wheels 21 and the center of the ball 1, and the angle of tilt of the ball 1 axis. An example of such a relationship is described below, with respect to FIGS. 25, 26 and 27.

Now referring to embodiments illustrated by FIGS. 1, 5, and 7, one or more stator wheels 30 can be attached to each leg 2 with a stator wheel pin 31 that is inserted through a hole in each leg 2. The stator wheel pins 31 are of the proper size and design to allow the stator wheels 30 to rotate freely over each stator wheel pin 31. The stator wheels 30 roll along the concave curved surfaces 90. The stator wheels 30 provide axial support to prevent the legs 2 from moving axially and also to ensure that the ball axles 3 tilt easily when the transmission 100 is shifted.

Referring to FIGS. 1 and 7, a spoked input disc 34, located adjacent to the stator 80a, partially encapsulates but generally does not contact the stator 80a. The input disc 34 may have two or more spokes or may be a solid disc. The spokes reduce weight and aid in assembly of the transmission 100. In other embodiments, a solid disc can be used. The input disc 34 has two sides, a first side that contacts with the balls 1, and a second side that faces opposite the first side. The input disc 34 is generally an annular disk that fits coaxially over, and extends radially from, a set of female threads or nut 37 at its inner diameter. The outside diameter of the input disc 34 is designed to fit within the case 40, if the case 40 used is the type that encapsulates the balls 1 and the input disc 34 and mounts to a rigid support structure 116 such as a chassis or frame with conventional bolts, which are inserted through bolt holes in a flange on the case 40. As mentioned above, the input disc 34 is in rotating contact with the balls 1 along a circumferential ramped or bearing contact surface on a lip of the first side of the input disc 34, the side facing the balls 1. As also mentioned above, some embodiments of the input disc 34 have a set of female threads 37, or a nut 37, inserted into its inside diameter, and the nut 37 is threaded over a screw 35, thereby engaging the input disc 34 with the screw 35.

Referring to FIGS. 1 and 4, the screw 35 is attached to and rotated by a drive shaft 69. The drive shaft 69 is generally cylindrical and has an inner bore, a first end facing axially towards the output side, a second end facing axially toward the input side, and a generally constant diameter. At the first end, the drive shaft 69 is rigidly attached to and rotated by the input torque device, usually a gear, a sprocket, or a crankshaft from a motor. The drive shaft 69 has axial splines 109 extending from its second end to engage and rotate a corresponding set of splines formed on the inside diameter of the screw 35. A set of central drive shaft ramps 99, which on a first side is generally a set of raised inclined surfaces on an annular disk that is positioned coaxially over the drive shaft 69, have mating prongs that mate with the splines 109, are rotated by the drive shaft 69, and are capable of moving axially along the drive shaft 69. A pin ring 195 contacts a second side of the central drive shaft ramps 99. The pin ring 195 is a rigid ring that is coaxially positioned over the idler rod 171, is capable of axial movement and has a transverse bore that functions to hold an idler pin 196 in alignment with the idler rod 171. The idler pin 196 is an elongated rigid rod that is slightly longer than the diameter of the pin ring 195 and which is inserted through an elongated slot 173 in the idler rod 171 and extends slightly beyond the pin ring 195 at both its first and second ends when it is inserted into the bore of the pin ring 195.

The elongated slot 173 allows for axial movement of the idler rod 171 to the right, when viewed as illustrated in FIG. 1, without contacting the pin 196 when the transmission 100 is shifted from 1:1 toward high. However, when the transmission 100 is shifted from 1:1 toward low, the side on the input end of the elongated slot 173 contacts the pin 196, which then operably contacts the central drive shaft ramps 99 via the pin ring 195. The idler rod 171 is thus operably connected to the central drive shaft ramps 99 when the transmission is between 1:1 and low so that when the idler rod 171 moves axially the central drive shaft ramps 99 also move axially in conjunction with the idler rod 171. The ramp surfaces of the central drive shaft ramps 99 can be helical, curved, linear, or any other shape, and are in operable contact with a set of corresponding central bearing disc ramps 98. The central bearing disc ramps 98 have ramp faces that are complimentary to and oppose the central drive shaft ramps 99. On a first side, facing the output side of the transmission 100, the central bearing disc ramps 98 face the central drive shaft ramps 99 and are contacted and driven by the central drive shaft ramps 99.

The central bearing disc ramps 98 are rigidly attached to a bearing disc 60, a generally annular disc positioned to rotate coaxially about the longitudinal axis 11. The bearing disc 60 has a bearing race near its perimeter on its side that faces away from the balls 1 that contacts a bearing disc bearing 66. The bearing disc bearing 66 is an annular thrust bearing at the perimeter of the bearing disc 60 and is positioned between the bearing disc 60 and the case cap 67. The bearing disc bearing 66 provides axial and radial support for the bearing disc 60 and in turn is supported by a bearing race on a case cap 67, which acts with the case 40 to partially encapsulate the inner parts of the transmission 100.

Referring to FIG. 1, the case cap 67 is generally an annular disc extending from the drive shaft 69 having a tubular portion extending toward the output end from at or near its perimeter and also having a bore through its center. The case cap 67 absorbs axial and radial forces produced by the transmission 100, and seals the transmission 100, thereby preventing lubricant from escaping and contamination from entering. The case cap 67 is stationary and, in some embodiments, is rigidly attached to the case 40 with conventional fastening methods or can have male threads on its outside diameter, which mate with corresponding female threads on the inside diameter of the case 40. As was mentioned above, the case cap 67 has a bearing race that contacts the bearing disc bearing 66 near the perimeter of the bearing disc 60 that is located at the inside of the output end of the tubular extension from the case cap 67. The case cap 67 also has a second bearing race facing the output side located near the inside diameter of its annular portion that mates with a drive shaft bearing 104. The drive shaft bearing 104 is a combination thrust and radial bearing that provides axial and radial support to the drive shaft 69. The drive shaft 69 has a bearing race formed on its outside diameter facing the input side that mates with the drive shaft bearing 104, which transfers the axial force produced by the screw 35 to the case cap 67. An input bearing 105, adds support to the drive shaft 69. The input bearing 105 is coaxially positioned over the drive shaft 69 and mates with a third race on the inside diameter of the case cap 67 facing the input side of the transmission 100. A cone nut 106, a generally cylindrical threaded nut with a bearing race designed to provide a running surface for the input bearing 105, is threaded over the drive shaft 69 and supports the input bearing 105.

Referring to the embodiment illustrated in FIG. 1, a set of multiple perimeter ramps 61, generally forming a ring about the longitudinal axis 11, are rigidly attached to the bearing disc 60. The perimeter ramps 61 are multiple inclined surfaces that are positioned radially about the longitudinal axis 11 and are positioned against or formed on the bearing disc 60 and face the output side. The inclined surfaces can be curved, helical, linear, or another shape and each one creates a wedge that produces and axial force that is applied to one of multiple ramp bearings 62. The ramp bearings 62 are spherical but can be cylindrical, conical, or another geometric shape, and are housed in a bearing cage 63. The bearing cage 63 of the illustrated embodiment is generally ring shaped with multiple apertures that contain the individual ramp bearings 62. A set of input disc ramps 64 are rigidly attached to, or formed as part of, the input disc 34. The input disc ramps 64 in some embodiments are complimentary to the perimeter ramps 62 with the ramps facing toward the input side. In another embodiment, the input disc ramps 64 are in the form of a bearing race that aligns and centers the ramp bearings 62 radially. The ramp bearings 62 respond to variations in torque by rolling up or down the inclined faces of the perimeter ramps 61 and the input disc ramps 64.

Referring now to FIGS. 1 and 4, an axial force generator 160 is made up of various components that create an axial force that is generated and is applied to the input disc 34 to increase the normal contact force between the input disc 34 and the balls 1, which is a component in the friction the input disc 34 utilizes in rotating the balls 1. The transmission 100 produces sufficient axial force so that the input disc 34, the balls 1, and the output disc 101 do not slip, or slip only an acceptable amount, at their contact points. As the magnitude of torque applied to the transmission 100 increases, an appropriate amount of additional axial force is required to prevent slippage. Furthermore, more axial force is required to prevent slippage in low than in high or at a 1:1 speed ratio. However, providing too much force in high or at 1:1 will shorten the lifespan of the transmission 100, reduce efficiency, and/or necessitate larger components to absorb the increased axial forces.

Ideally, the axial force generator 160 will vary the axial force applied to the balls 1 as the transmission 100 is shifted and also as torque is varied. In some embodiments, the transmission 100 accomplishes both these goals. The screw 35 is designed and configured to provide an axial force that is separate and distinct from that produced by the perimeter ramps 61. In some embodiments, the screw 35 produces less axial force than the perimeter ramps 61, although in other versions of the transmission 100, the screw 35 is configured to produce more force than the perimeter ramps 61. Upon an increase in torque, the screw 35 rotates slightly farther into the nut 37 to increase axial force by an amount proportional to the increase in torque.

If the transmission 100 is in a 1:1 ratio and the user or vehicle shifts into a lower speed, the idler rod 171, moves axially toward the input side, along with the sleeve 19, sleeve bearings 172, shift guides 13a, 13b, and idler 18. The idler rod 171 contacts the central drive shaft ramps 99 through the pin 196 and pin ring 195, causing the central drive shaft ramps 99 to move axially toward the output side. The ramped surfaces of the central drive shaft ramps 99 contact the opposing ramped surfaces of the central bearing disc ramps 98, causing the central bearing disc ramps 98 to rotate the bearing disc 60 and engage the perimeter ramps 61 with the ramp bearings 62 and the input disc ramps 64. The central drive shaft ramps 99 and the central bearing disc ramps 98 perform a torque splitting function, shifting some of the torque from the screw 35 to the perimeter ramps 61. This increases the percentage of transmitted torque that is directed through the perimeter ramps 61, and due to the fact that the perimeter ramps 61 are torque sensitive as described above, the amount of axial force that is generated increases.

Still referring to FIGS. 1 and 4, when shifting into low, the idler 18 moves axially towards the output side, and is pulled toward low by a reaction of forces in the contact patch. The farther the idler 18 moves toward low, the stronger it is pulled. This "idler pull," which increases with an increase in normal force across the contact as well as shift angle, also occurs when shifting into high. The idler pull occurs due to a collection of transverse forces acting in the contact patch, the effect of which is called spin. Spin occurs at the three contact patches, the points of contact where the balls contact the input disc 34, the output disc 101, and the idler 18. The magnitude of the resultant forces from spin at the contact between the idler 18 and the balls 1 is minimal in comparison to that of the balls 1 and input and output discs 34, 101. Due to the minimal spin produced at the contact patch of the idler 18 and ball 1 interface, this contact patch will be ignored for the following explanation. Spin can be considered an efficiency loss in the contact patches at the input disc 34 and ball 1 and also at the output disc 101 and ball 1.

Spin produces a transverse force perpendicular to the rolling direction of the balls 1 and discs 34, 101. At a 1:1 ratio the transverse forces produced by spin, or contact spin, at the input and output contact patches are equal and opposite and are essentially cancelled. There is no axial pull on the idler 18 in this condition. However, as the transmission 100 is shifted toward low for example, the contact patch at the input disc 34 and ball 1 moves farther from the axis or pole of the ball 1. This decreases spin as well as the transverse forces that are produced perpendicular to the rolling direction. Simultaneously the output disc 101 and ball 1 contact patch moves closer to the axis or pole of the ball 1, which increases spin and the resultant transverse force. This creates a situation where the transverse forces produced by spin on the input and output sides of the transmission 100 are not equal and because the transverse force on the output contact is greater, the contact patch between the output disc 101 and ball 1 moves closer to the axis of the ball 1. The farther the transmission 100 is shifted into low the stronger the transverse forces in the contacts become that are exerted on the ball 1. The transverse forces caused by spin on the ball 1 exert a force in the opposite direction when shifting into high. The legs 2 attached to the ball axles 3 transfer the pull to the shift guides 13a, 13b, and because the shift guides 13a, 13b, are operably attached to the idler 18 and sleeve 19, an axial force is transferred to the idler rod 171. As the normal force across the contact increases, the influence of contact spin increases at all ratios and efficiency decreases.

Still referring to FIGS. 1 and 4, as the transmission 100 is shifted into low, the pull transferred to the idler rod 171 results in an axial force toward the left, as viewed in FIG. 1, which causes the input torque to shift from the screw 35 to the perimeter ramps 61. As the transmission 100 is shifted into extreme low, the idler rod 171 pulls more strongly, causing relative movement between the central drive shaft ramps 99 and the central bearing disc ramps 98 and shifts even more torque to the perimeter ramps 61. This reduces the torque transmitted through the screw 35 and increases the torque transmitted through the perimeter ramps 61, resulting in an increase in axial force.

Figure 9:
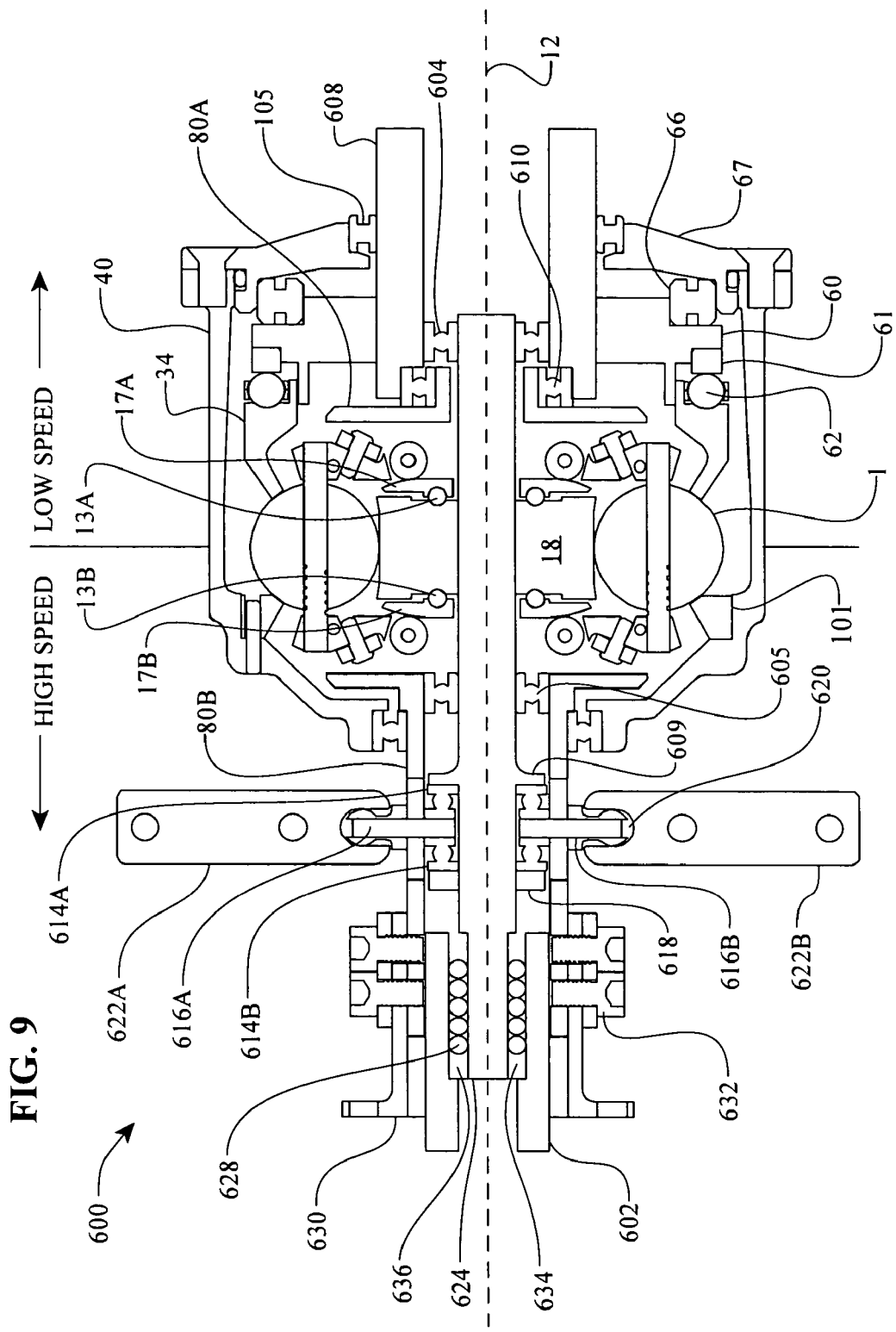
FIG. 9 is a cutaway side view of an embodiment of a transmission in accordance with the inventive features disclosed herein.
Figure 10:
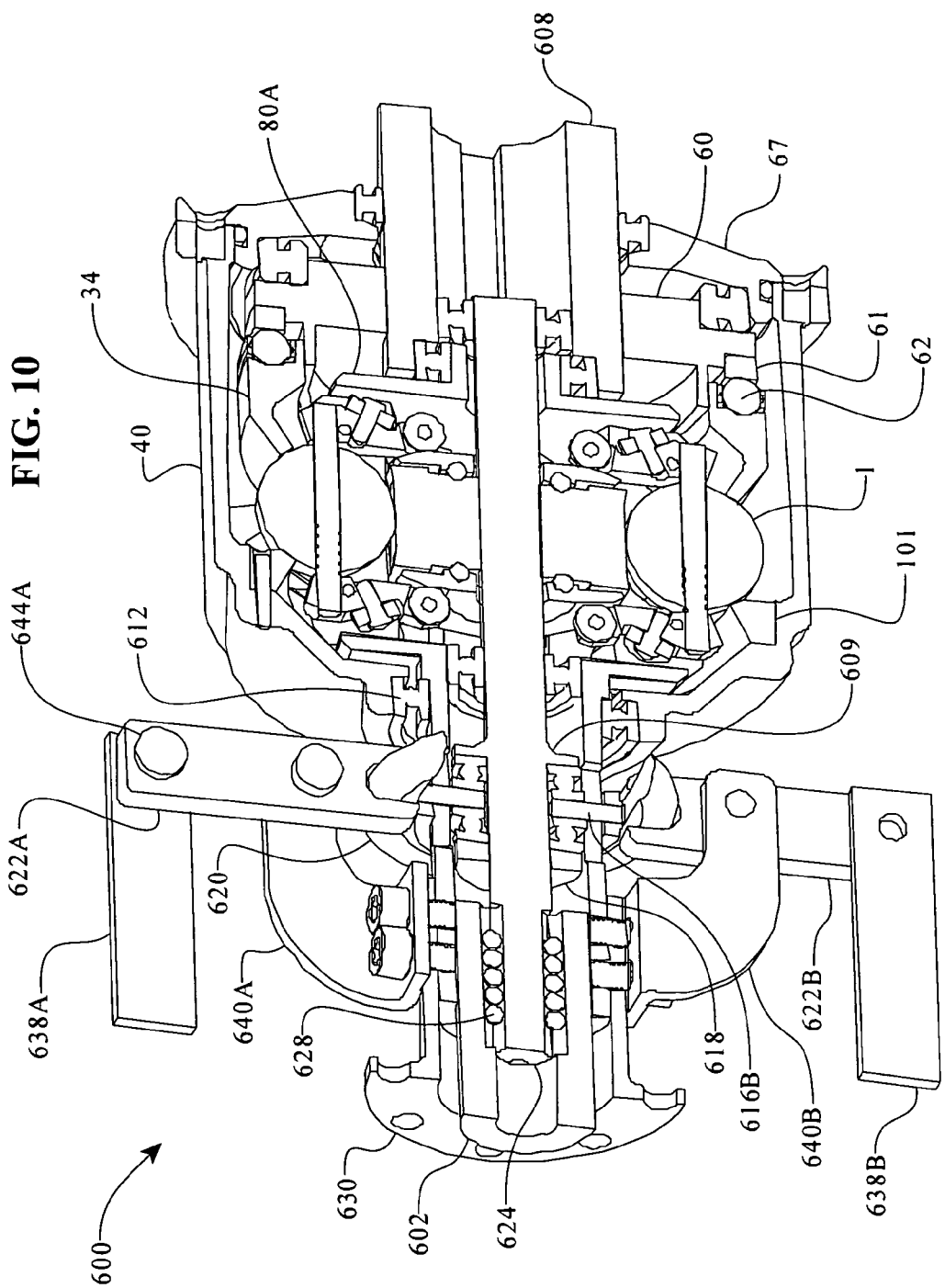
FIG. 10 is a partial cutaway perspective view of the transmission of FIG. 9.

Referring now to FIGS. 9 and 10, an alternative embodiment of the transmission 100 is disclosed. For simplicity, only the differences between the transmission 600 and the transmission 100 will be described. The transmission 600 is capable of increasing or decreasing speed in addition to varying speed. Referring to FIG. 9, two vertical dashed lines at the top and bottom of the transmission 600 and positioned at the center of the balls 1, denote high speed and low speed sides of the transmission 600. Where an increase in speed through the transmission 600 is desired, the low speed shaft 608 accepts input from a motor, human powered device, or other torque generating means. In some embodiments, the low speed shaft 608 is hollow and has a keyway formed on its interior diameter to accommodate a mating shaft inserted into its bore. In other embodiments, the low speed shaft 608 can be solid and formed integral to the torque generating device. In still other embodiments the low speed shaft 608 can be threaded, pinned, welded, glued, or joined with conventional fasteners such as screws to the torque generating means. The low speed shaft 608 material can be steel, aluminum, titanium, plastic, or any other suitable material for the intended application. The low speed shaft 608 rotates about a longitudinal axis 12 and is supported and located by the input bearing 105 and the low speed shaft bearing 604. In some embodiments the low speed shaft bearing 604 is a radial bearing coaxially positioned in the inside diameter of the low speed shaft 608. In other embodiments the low speed shaft bearing 604 is an angular contact bearing.

Still referring to FIGS. 9 and 10, the low speed shaft 608 is rigidly attached to the bearing disc 60. In some embodiments, the bearing disc 60 is pressed over the outside diameter of the low speed shaft 608 with an interference press fit. In other embodiments the bearing disc 60 can be keyed, pinned, fastened with adhesive, welded, or threaded to the low speed shaft 608. In some embodiments, a low speed stator bearing 610 is used to align the input stator 80a relative to the low speed shaft 608. The low speed stator bearing 610 is preferably a radial bearing that fits into an inside diameter of the low speed shaft 608 and also over a flange or into the bore of the input stator 80a.

Still referring to FIGS. 9 and 10, power is transferred from the bearing disc 60 to the perimeter ramps 61, to the ramp bearings 62, to the input disc 34, to the balls 1, to the idler 18, and to the transfer shaft 624. The idler 18 is rigidly attached to the transfer shaft 624, which is a long cylindrical component that rotates about the longitudinal axis 12. In some embodiments, the idler 18 is attached with an interference press fit, while in other embodiments it can be keyed, pinned, fastened with adhesive, welded, or threaded to the transfer shaft 624. In still other embodiments, the idler 18 and the transfer shaft 624 are combined into one part. The transfer shaft 624 at a first end on the low speed side of the transmission 600 is inserted into the bore of the low speed shaft bearing 604 so that the transfer shaft 624 is able to slide axially. In some embodiments, the low speed shaft bearing 604 is eliminated and the transfer shaft 624 is shortened, terminating at the low speed side of the idler 18. The transfer shaft 624 in some embodiments is made from the same material as the idler 18 and in other embodiments can be made from a tough steel, such as 4130, that is partially heat treated. In low torque applications the transfer shaft 624 can be made from aluminum, titanium, plastic, or any other suitable material. The transfer shaft 624 is further supported and located by a high speed shaft bearing 605, which in some embodiments is a radial bearing inserted into the bore of the output stator 80b, and over the outside diameter of the transfer shaft 624, allowing the transfer shaft 624 to move axially. At a second end on the high speed side of the transmission 600 the transfer shaft has integrally formed into its surface one or more transfer grooves 634.

Figure 11:
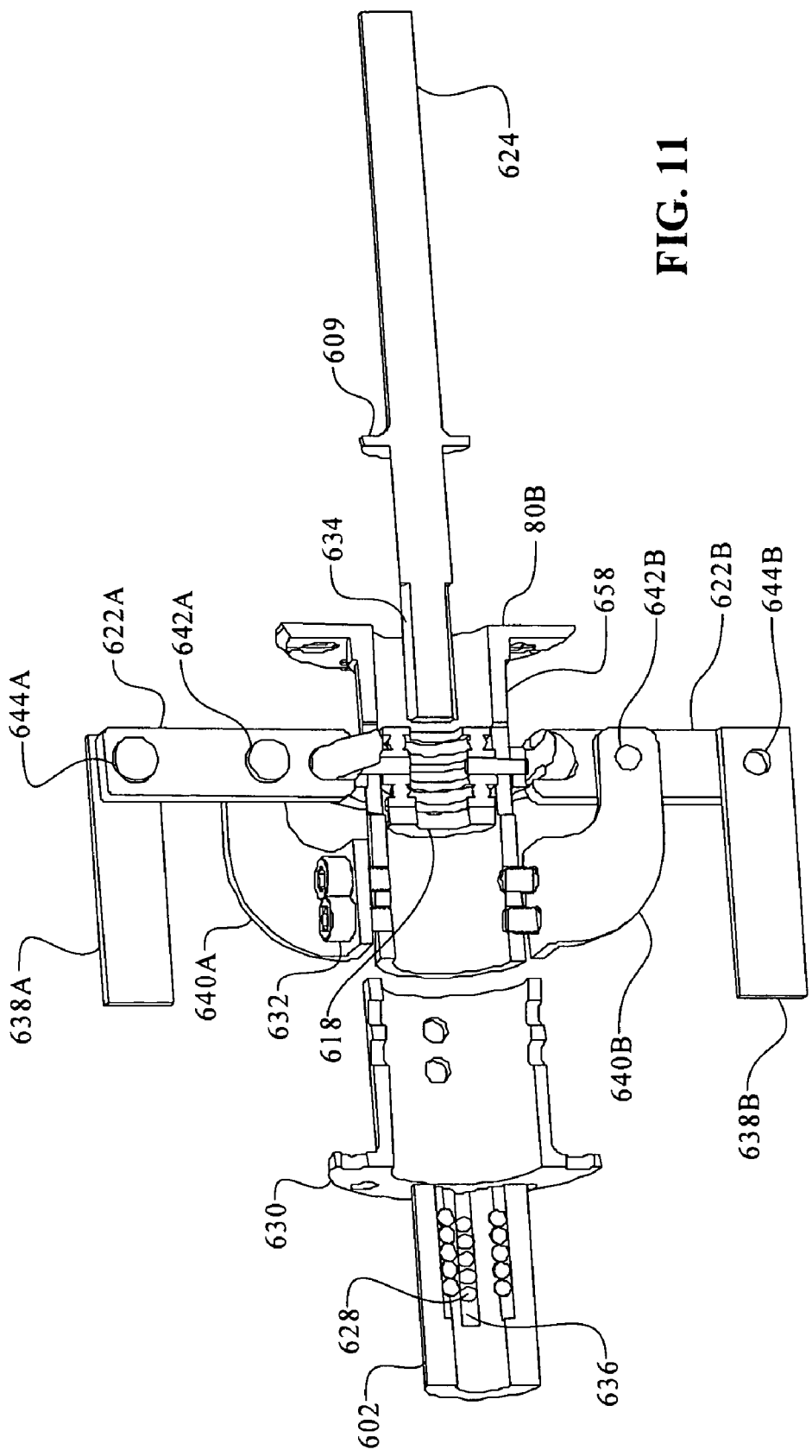
FIG. 11 is a partial cutaway exploded perspective view of a shifting sub-assembly for the transmission of FIG. 9.
Figure 12:
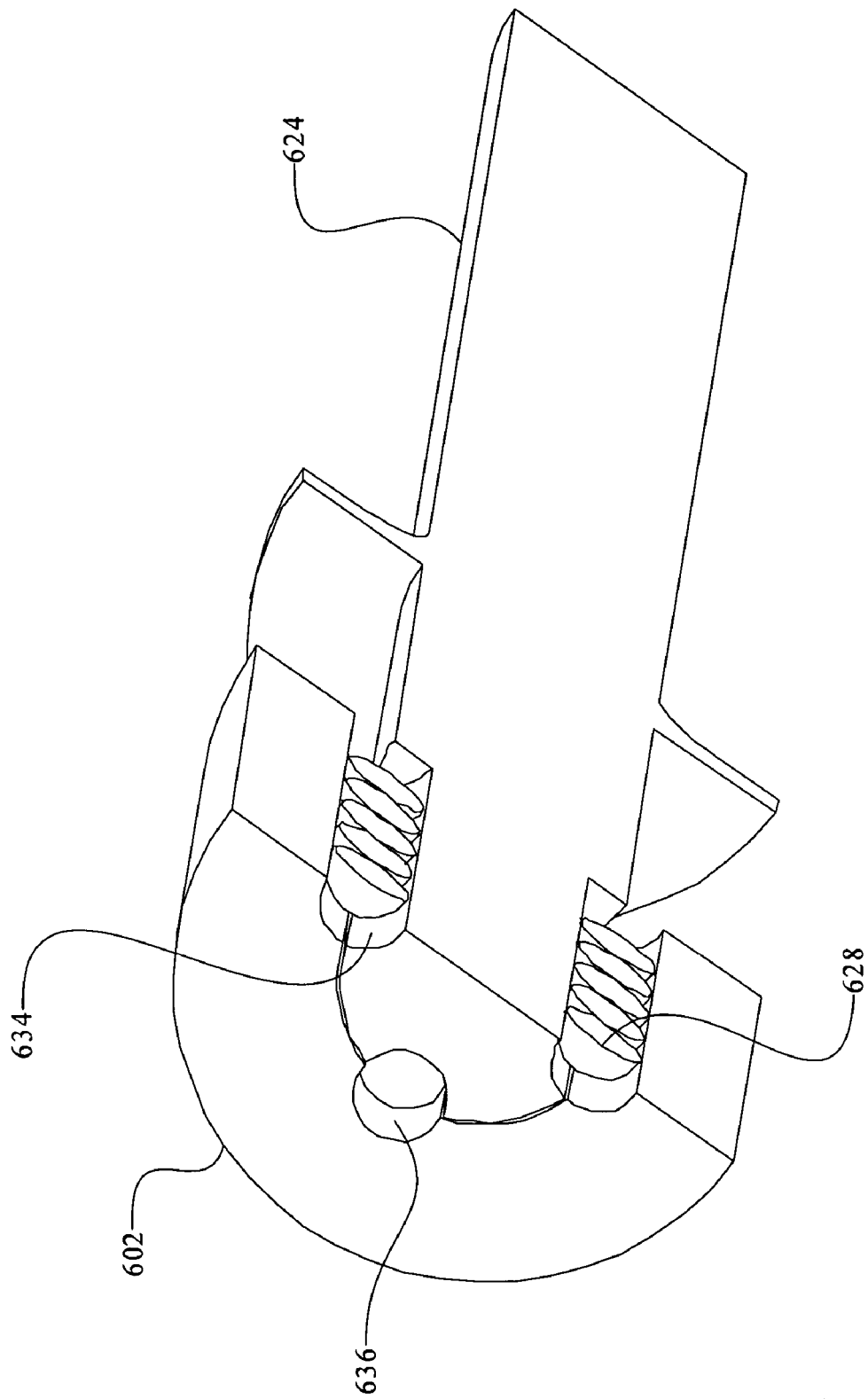
FIG. 12 is a cutaway perspective view of a torque transferring mechanism providing axial movement of the transmission of FIG. 9.

Referring to FIGS. 11 and 12, in some embodiments four transfer grooves 634 are formed into the transfer shaft 624, but in other embodiments 1, 2, 3, 5, 6, or more transfer grooves 634 can be used. Each transfer groove 634 is an indentation extending in a direction parallel with the longitudinal axis 12 and which has a concave radius profile. Fitted into each transfer groove 634 are one or more transfer bearings 628. The transfer bearings 628 are typically hardened steel spheres common in the art, and the size and number of transfer bearings 628 can be adjusted to suit the power requirements of the application. Typically, the transfer grooves 634 will have a radius that is slightly larger than the radii of the transfer bearings 628.

Still referring to FIGS. 11 and 12, a high speed shaft 602 contacts and is rotated by the transfer bearings 628. Corresponding shaft grooves 636, identical to the transfer grooves 634 except that they are formed on the inside diameter of the high speed shaft 602 rather than the outside diameter of the transfer shaft 624, are positioned so that the transfer bearings 628 fit into and contact both the transfer grooves 634 and the shaft grooves 636. Power is distributed among the transfer bearings 628 and is transferred from the transfer shaft 624 to the high speed shaft 602. The high speed shaft 602 is a generally cylindrically shaped component that rotates about the longitudinal axis 12. The inside diameter of the high speed shaft 602 is slightly larger than the outside diameter of the transfer shaft 624. The high speed shaft 602 can be attached to a drive shaft, generator, sprocket, pulley, gear, wheel, or any other rotating device. The transfer grooves 634 and the shaft grooves 636 are longer than the axial space taken up by the transfer bearings 628 so that the transfer bearings 628 can roll axially when the transmission 600 is shifted. For some embodiments, the transfer bearings 628 will roll half the distance that the idler 18 and transfer shaft 624 move axially when the transmission 600 is shifted and thus the lengths of the transfer grooves 634 and the shaft grooves 636 can be calculated with the following equation:

$$x/2 + d*y = \text{length of transfer groove 634 and shaft groove 636}$$

where x=the total axial distance the idler 18 can be shifted, d=the transfer bearing 628 diameter, and y=the number of transfer bearings 628 in each transfer groove 634.

In some embodiments, the lengths of each transfer groove 634 and shaft groove 636 are increased slightly to provide a margin of error so that the transfer bearings 628 do not run out of space when they are rolling axially.

Referring to FIGS. 10, 11, 12, 16, and 17, shifting of the transmission 600 will be described. The output stator 80b comprises a stator tube 658 which extends through the wall of the case 40 (seen in FIG. 10). Outside of the case 40, the stator tube 658 fits into the bore of the brace 630. The brace 630 is a generally cylindrical component with a flange at a first end, and in some embodiments is made from steel. In other embodiments, the brace 630 can be made from aluminum, titanium, plastic, a composite, or any other suitable material. Holes positioned circumferentially around the flange provide for attachment of the brace 630 to a strong stationary structure (not shown), such as a frame or the case of a generator. Fasteners, such as bolts or machine screws are inserted through the flange holes on the brace 630, and then through corresponding holes in the stationary structure to rigidly and securely attach the brace 630.

At a second end of the brace 630, additional holes which extend radially through the cylindrical portion of the brace 630 align with stator holes 654 in the stator tube 658. The output stator 80b fits inside of the bore of the brace 630 with a small amount of clearance although in some embodiments the brace 630 fits inside the bore of the output stator 80b. The lever mounts 640a and 640b are rigid, L-shaped components incorporating a bend at a first end and attach to and provide a pivot for the levers 622a and 622b. Two lever mounts 640a, 640b, are used although 1, 3, 4, or more may be used. The lever mounts 640a, 640b, at a first end, the end with the bend, have holes which align with holes on the brace 630. Brace fasteners 632, which can be standard fasteners such as machine screws or bolts, are used to secure the lever mounts 640a, 640b, to the brace 630 and the output stator 80b. In some embodiments, the holes in the lever mounts 640a, 640b, and the brace 630 are clearance holes, and the stator holes 654 are threaded. At a second end of the lever mount 640, a single hole is provided to allow attachment of a lever 622 to the lever mount 640. A corresponding hole in the lever 622 provides for mounting a lever pin 642 through the lever 622 to the lever mount 640. Preferably, a small amount of clearance between the lever pin 642 and the hole in the lever 622 is provided so that the lever 622 may rotate freely about the pivot created by the lever pin 642.

In some embodiments a second hole, located near a first end of the generally elongated, flat, bar shaped lever 622, is provided so that an actuator pin 644 may be inserted through the second hole into an actuator 638. Both the lever pin 642 and actuator pin 644 may be fastened with threads, an interference fit, or other suitable methods. An actuator 638, a generally flat, straight, bar shaped component is attached to the actuator pin 644 near a first end. Near a second end the actuator 638 can be attached to a device (not shown) that controls shifting, such as a servo motor, cable, or actuator. Upon axial movement of the actuator 638, the lever 622 pivots about the lever pin 642. The mechanical advantage of the lever can be controlled by adjusting the distance between the lever pin 642 and the actuator pin 644.

Referring to FIGS. 9, 11, 16, and 17, in some embodiments the lever 622 near a second end is forked shaped with a slot formed into its second end. The slot surrounds and contacts a shift ring 620, which in some embodiments is an annular ring with a profile of a radius at its outside diameter and a flat on its inside diameter. The mechanical advantage of the lever 622 can be adjusted by changing the distance between the shift ring 620 and the lever pin 642. The shift ring 620 in some embodiments is made from hardened steel to resist wear, although in other embodiments different wear resistant materials such as plastic can be used. The inside diameter of the shift ring 620 is slightly larger than the outside diameter of the output stator 80b, to allow axial sliding of the shift ring 620 over the stator tube 658. Ring holes 660 are formed into the shift ring 620 to allow insertion of shift pins 616a, 616b into the shift ring 620. In some embodiments, the shift pins 616a, 616b are hardened dowel pins which are pressed with an interference fit into the ring holes 660. The shift pins 616a,

616b may also be attached with adhesive or other methods common in the art. The shift pins 616a, 616b are inserted into the shift ring 620 after the shift ring 620 is assembled over the stator tube 658 and positioned so that the ring holes 660 are aligned with the stator slots 656.

In some embodiments, there are two stator slots 656 although 1, 3, 4, or more be used. The stator slots 656 are elongated slots formed parallel with the longitudinal axis 12 and provide enough space so that the shift pins 616a, 616b, may slide freely in an axial direction within the stator slot 656. The shift pins 616a, 616b extend through the stator slots 656 inside the stator tube 658. Positioned on either side of and contacting the shift pins 616a, 616b, on a first side are the shift bearings 614a, 614b. The shift bearings 614a and 614b may be annular bearings capable of absorbing thrust loads and are coaxial with the longitudinal axis 12. On a second side, the shift bearing 614a contacts the shaft flange 609 on the transfer shaft 624. The shaft flange 609 is a disc shaped protrusion on the transfer shaft 624 and in some embodiments is formed integral to the transfer shaft 624. On a second side, the shift bearing 614b contacts the shift lock 618, an annular ring which in some embodiments is threaded onto the transfer shaft 624 until it contacts shift bearing 614b. The shift lock 618 can be held in place with adhesive, or the threads may terminate slightly before the shift lock 618 contacts shift bearing, 614b, and the shift lock 618 can be tightened against shift bearing 614b. In other embodiments, the shift lock 618 is pressed over the transfer shaft 624 with an interference fit until it contacts shift bearing 614a. When the actuators 638a, 638b, are moved axially toward the high speed shaft 630, the transfer shaft 624 and idler 18 move axially toward the low speed shaft 608, shifting the transmission to a higher speed. When the actuators 638a, 638b, are moved axially toward the low speed shaft 608, the transfer shaft 624 and idler 18 move axially toward the high speed shaft 630, shifting the transmission to a lower speed.

Referring now to FIGS. 9 and 10, the output disc 101 of the transmission 600 is rigidly attached to, and rotates with, the case 40. In some embodiments, the output disc 101 can be formed as part of the case 40. When the balls 1 are positioned so that their axes are parallel with the longitudinal axis 12, the case 40 rotates at the same speed as the input disc 34. At this ratio, there is no relative movement between the case 40 and the input disc 34, and the bearing disc bearing 66 does not rotate. At this ratio, efficiency of the transmission 600 is maximized and it is recommended that in most applications the transmission 600 be designed so that the case 40 and the input disc 34 are rotating at the same speed at the speed ratio most frequently used.

Figure 13:
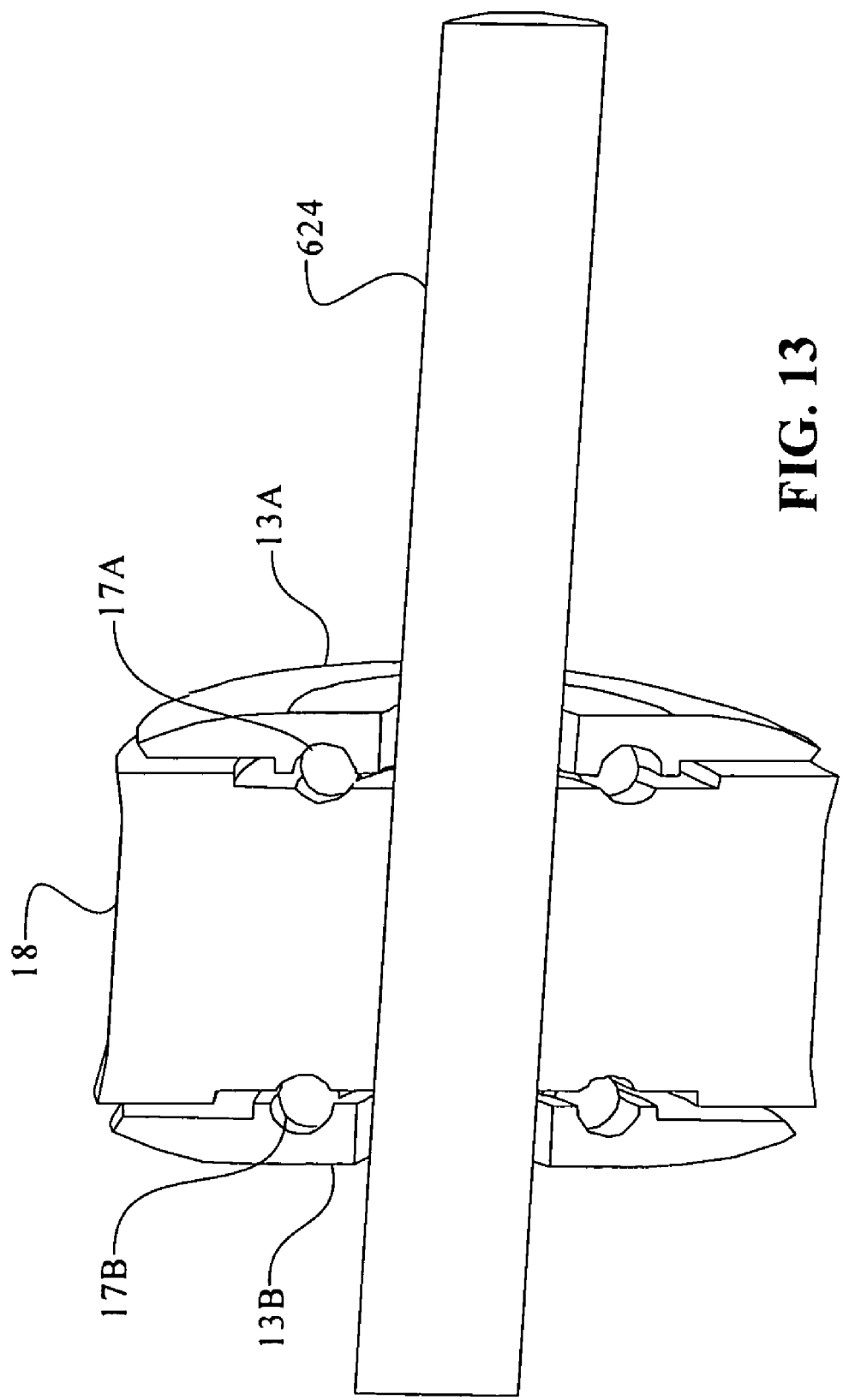
FIG. 13 is a cutaway perspective view of an idler and shift guide sub-assembly of the transmission of FIG. 9.
Figure 17:
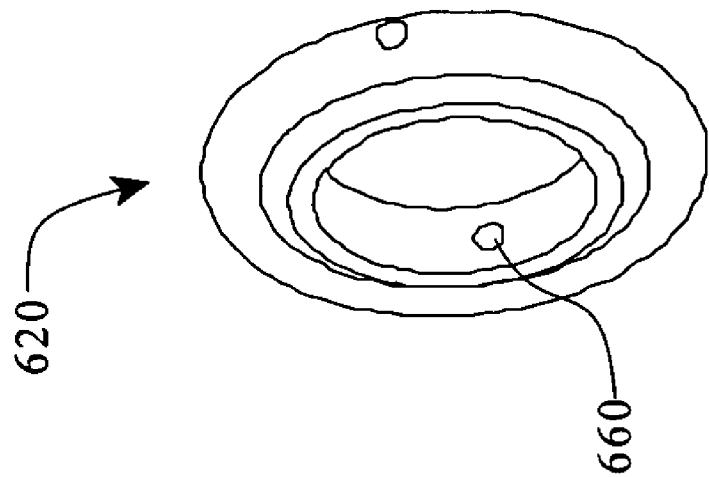
FIG. 17 is a perspective view of a shift ring of the transmission of FIG. 9.
Figure 16:
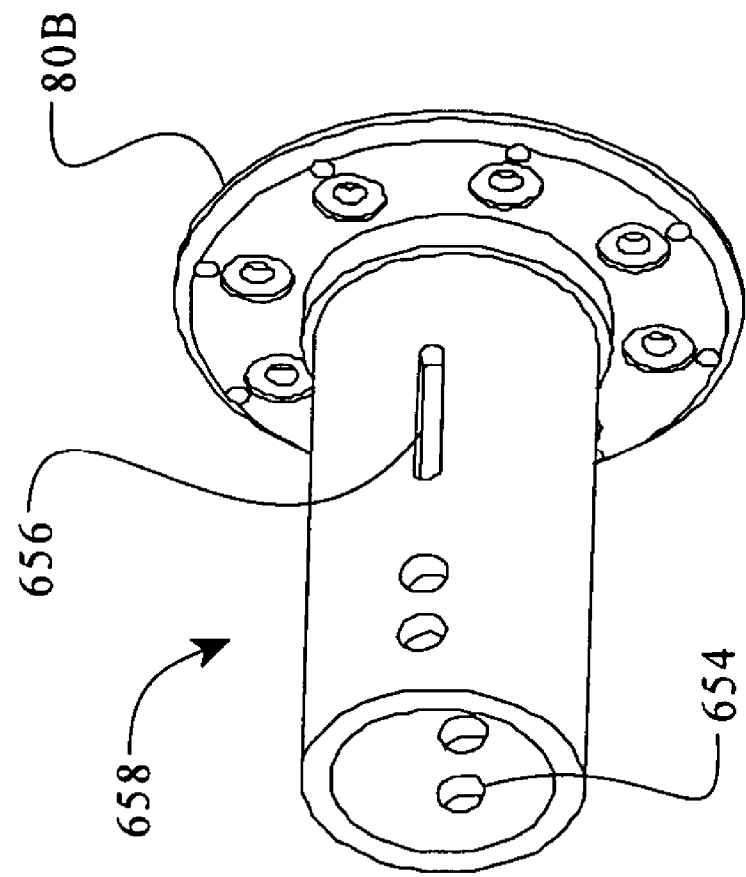
FIG. 16 is a perspective view of an output stator of the transmission of FIG. 9.

Referring to FIG. 13, it shows the idler 18 and the shift guides 13a, 13b. Due to the fact that the transfer shaft 624 rotates, clearance between the bore of the shift guides 13a, 13b, and the transfer shaft 624 is preferred so that the components do not rub against each other. In some embodiments, a bearing race is formed into the shift guides 13a, 13b, and the idler 18, to house the idler bearings 17a, 17b. In other embodiments, stock bearings may be used and it is not necessary to form a bearing race into the shift guides 13a, 13b, and the idler 18.

Figure 18:
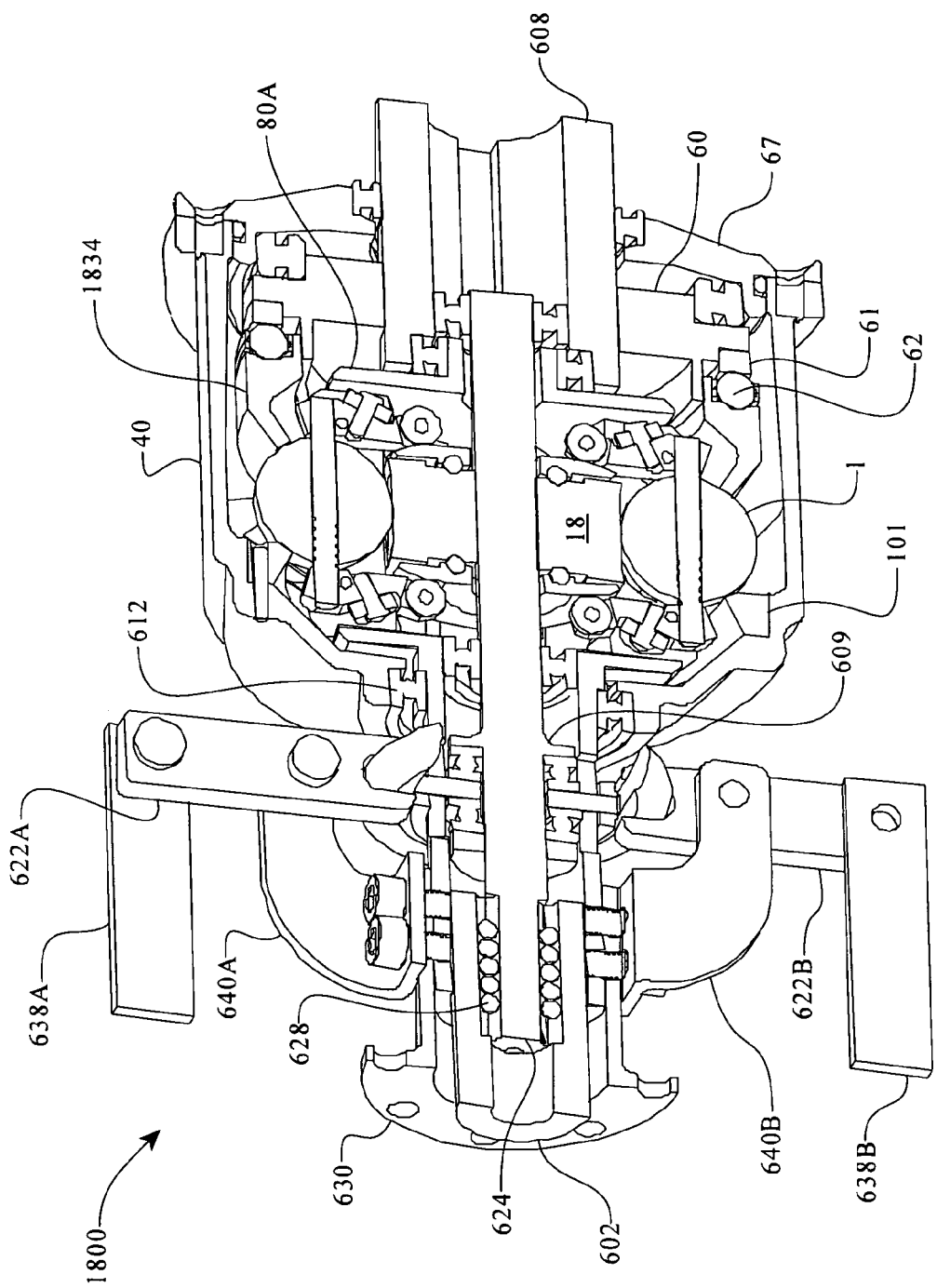
FIG. 18 is a partial cutaway perspective view of an alternative embodiment of the transmission in accordance with the inventive features disclosed herein.

Referring to FIG. 18, an alternative transmission 1800 is designed to decrease speed as well as vary speed. Compared to the transmission 600, in the transmission 1800 the input and output are switched, otherwise the transmissions 600 and 1800 are similar. In a transmission 1800 designed to decrease speed, the high speed shaft 602, is attached to input torque means, such as an electric motor, internal combustion engine, human powered machine, etc. Power follows the reverse direction of the transmission 600 and exits through the low speed shaft 608. The input disc 34 of transmission 600 is no longer an input disc 34, and becomes the low speed disc 1834 of transmission 1800, but is otherwise similar to the input disc 34.

Referring to FIGS. 14 and 15, the speed ratios of a speed increasing transmission 600 are explained. Near the top of FIG. 14, an angle alpha of 45 degrees is shown. Alpha is the angle in degrees at which the input disc 34 and output disc 101 contact the balls 1 from their equators when the ball axles 3 are parallel to the longitudinal axis 12. Near the center right of FIG. 14, an angle gamma of 22 degrees is shown. Gamma is the angle in degrees at which the ball axles 3 are tilted relative to the longitudinal axis 12, to produce variable speed and torque. The idler track 650 shows the circle diameter on the ball 1 where the idler 18 and ball 1 contact. It can be seen in FIG. 14 that with a positive gamma of 22 degrees, the idler track 650 is larger than the input disc track 652. A track generally refers to a path of frictional contact. In FIG. 15 it can be seen that with a negative gamma of 22 degrees, the idler track 650 and the input disc track 652 are nearly equal, and when negative gamma is one half of alpha, the idler track 650 and the input disc track 652 are equal. When negative gamma equals one half alpha, the speed increase through the transmission 600 is equal to the input disc 34 radius divided by the idler 18 radius. For a speed decreasing transmission 1800, the relationships shown in FIGS. 14 and 15 are the same as for transmission 600 but the power direction is reversed.

Referring now to FIGS. 19 and 20, relationships among transmission 100, transmission 600, and transmission 1800, are shown in two charts. In these charts, the top row provides variables from which speed ratios and relationships can be calculated. The first variable is alpha, and by comparing FIG. 19 with FIG. 20, it can be seen that changing alpha from 50 to 35 degrees produces significant changes in the transmissions 100, 600, and 1800. The row immediately underneath the top row gives the names of the variables calculated in each column. For example, the first cell in the second row is gamma, and the column underneath gamma lists various values for gamma. The second cell in the second row is Ball radius @ input, which is equal to one half the input disc track 652. The third cell is Ball radius @ output, and the column underneath this cell provides this radius at different values for gamma. The fourth cell is Ball radius @ idler, which is equal to one half the idler track 650. The fifth cell is Speed Increaser Ratio, which is the ratio produced by the transmission 600. The sixth cell, Ratio range, gives the overall ratio for various values of gamma. The seventh cell, Average speed increase, provides the average speed increase at various gamma values. The eighth cell is termed Normal Mode Speed Ratio which gives the ratios for the transmission 100. The ninth cell, Speed Reducer Ratio, gives the speed ratios for the transmission 1800. The tenth cell, Ratio range, gives the overall ratio range for the transmission 1800. The eleventh cell, Average Speed Decrease, gives the average speed decrease for the transmission 1800.

It can be seen that in the column Speed Increaser Ratio, which is the ratio produced by the transmission 600, speed does not change linearly with changes in gamma. For example, in FIG. 19, the change in speed from a gamma of −24 to −25 is 0.03, while the change in speed from 24 to 25 is 0.38, a rate of change over 12 times greater than 0.03. This produces a situation where larger changes in negative gamma are required to achieve the same speed and torque ratio change as positive gamma. Due to the fact that output speed is lower in gammas with negative values than in positive gammas, output torque is higher in gammas with negative values.

Thus, at higher output torques the balls 1 and idler 18 move more than at lower output torques for equivalent ratio changes, which spreads wear over larger surface areas of the balls 1 and idler 18.

Referring to FIGS. 10 and 18, the relationships of torque and speed through the transmissions 600 and 1800 are explained. In the transmission 600, torque enters through the low speed shaft 608, continuing through the bearing disc 60, perimeter ramps 61, and the ramp bearings 62, before reaching the input disc 34. An annular bearing race is formed on the input disc 34, which helps locate the ramp bearings 62. The ramp bearings 62 also serve an additional function of centering the input disc 34. Due to the fact that in the transmission 600 speed is always higher at the high speed shaft 602 than the low speed shaft 608, regardless of gamma, torque is always lower at the high speed shaft 602 than the low speed shaft 608. Thus, maximum torque occurs on the low speed, or input side of the transmission 600, and the optimal axial force to prevent slippage is determined by the highest torque produced in the transmission 600. The torque sensitive perimeter ramps 61 are thus located in the optimum area of transmission 600 to produce the optimum axial force at all ratios, which is between the low speed shaft 608 and the balls 1. This simple method to optimize axial force at all ratios and at all torques maximizes efficiency of the transmission 600.

In the transmission 1800, torque enters the high speed shaft 602, travels a path through the transfer bearings 628, transfer shaft 624, idler 18, balls 1, low speed disc 1834, ramp bearings 62, perimeter ramps 61, and bearing disc 60, before reaching the low speed shaft 608. Due to the fact that in the transmission 1800 speed is always lower at the low speed shaft 608 than the high speed shaft 602, regardless of gamma, torque is always higher on the output side of the transmission 1800, between the balls 1 and the low speed shaft 608. Thus, the perimeter ramps 62 are ideally located on the output side of the transmission 1800 to optimize axial force at all ratios. This simple configuration maximizes efficiency of the transmission 1800 at all ratios and at all torques.

Figure 21:
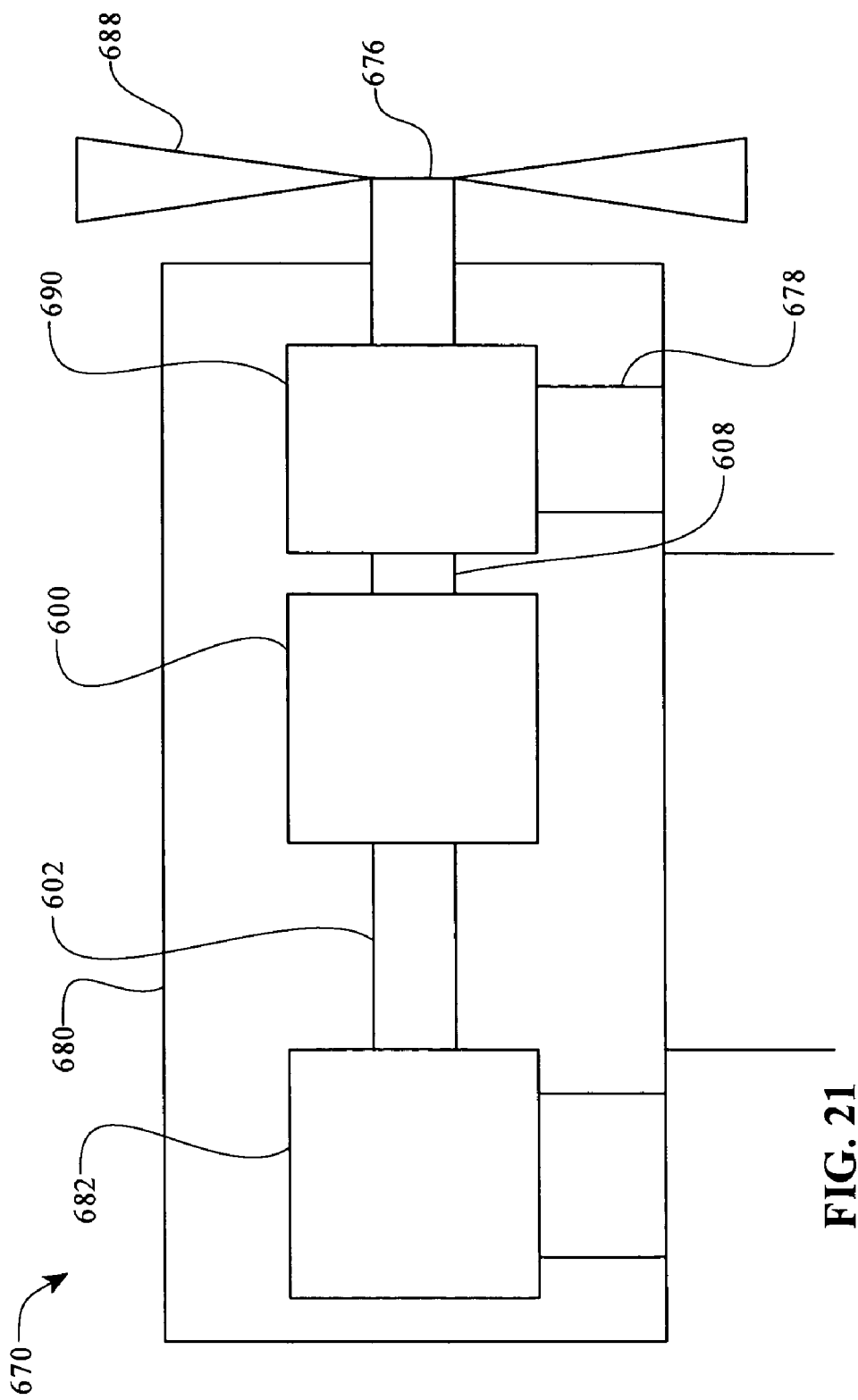
FIG. 21 is a schematic view of the transmission of FIG. 9 implemented in a wind turbine.

Referring to FIG. 21, an embodiment of the transmission 600 is shown implemented in a wind turbine 670. Typically, in wind turbines the rotor 688 rotates at a speed slower than the generator 682. The rotor is attached to a gearbox shaft 676 which rotates a speed increasing gearbox 690. In some wind turbines, speed increases of over 50 times bridge the gap between rotor speed and the required generator 682 speed. For example, the wind turbine rotor 688 may rotate at 20 rpm while the generator requires a speed of 1200 rpm. For this configuration, the gearbox 690 may be adapted to increase speed 60 times. The gearbox 690 will typically increase speed in three stages, each stage increasing speed by a fixed ratio, generally between 3.5 and 6 times. There are variations to this range depending on the size of the wind turbine and the choice of generator 682. Since usually the gearbox 690 is expensive, heavy, and prone to breakage, it is desirable to minimize the size, weight, cost, and number of stages in the gearbox 690. Further, each stage of the gearbox 690 reduces efficiency, generally between 2-3%.

Still referring to FIG. 21, in some applications it is desirable to capture gusts of wind that produce torque spikes; however, these spikes can stress and ultimately damage the drivetrain of the wind turbine 670. Typically, a wind turbine 670 will respond to gusts by pitching the blades of the rotor 688 and shedding wind; however, this cannot be done instantaneously. A variable speed transmission 600 that can be shifted quickly in response to a gust would allow the rotor 688 to increase speed, capturing the gust and minimize, or completely eliminate, the damage caused by torque spikes. Further, the transmission 600 has torque spike absorbing characteristics, which include the perimeter ramps 61. The ramp bearings 62 will roll up the perimeter ramps 61 in response to an increase in torque, helping to absorb torque spikes.

Still referring to FIG. 21, it is desirable to vary speed of the rotor 688 as wind speeds change. This allows the rotor 688 to rotate at its aerodynamic optimum, maximizing the energy that can be extracted from the wind turbine 670. Generally, a variable speed wind turbine 670 will produce 10% more energy than a fixed speed wind turbine. However, the generator 682 requires a near constant speed. Currently, power electronics are used to create variable speed in a wind turbine.

Embodiments of the transmission 600 can be shifted so as to capture gusts and minimize damaging torque spikes, can increase speed and replace at least one stage of the gearbox 690, and can vary speed as wind speeds change, thus holding a constant speed into the generator 682.

Still referring to FIG. 21, a drivetrain for a wind turbine 670 that implements the transmission 600 is described. The gearbox 690 is rigidly attached to the nacelle 680 with the gearbox mount 678, a strong rigid structure designed to absorb the very large torques that are produced by a wind turbine 670 drivetrain. The nacelle 680 is a large stationary case which houses and protects the gearbox 690, transmission 600, generator 682, and other wind turbine components from the weather. On the output side of the gearbox 690, a shaft is connected to the low speed shaft 608 of the transmission 600. Speed is increased as well as varied through the transmission 600, which is located inside the nacelle 680, and between the gearbox 690 and the generator 682. Depending on wind speed and thus the rotor 688 speed, the transmission 600 will increase or decrease speed into the generator 682. If the rotor 688 speed is high due to strong winds, the transmission 600 will shift to a lower speed. If the rotor 688 speed is slow due to low wind speeds, the transmission 600 will shift to a higher speed.

Referring now to FIG. 22, a textured surface 701 profile of the balls 1, the input disc 34, the low speed disc 1834, the output disc 101, and the idler 18, is shown for the transmissions 100, 600, and 1800. The textured surface 701 in some embodiments are of a shape that resist wear and preferably do not have any sharp corners or features prone to removal or deformation. In some embodiments, the textured surface 701 produces microscopic domes from 1-10 microns on the surfaces of the above components, depending on the speed, size, and torque rating of the transmissions 100, 600, 1800. The textured surface 701 can be formed into the balls 1, input disc 34, low speed disc 1834, output disc 101, and idler 18 by tumbling, shot peening, sandblasting, laser etching, or any other suitable method. If the components are made from molded plastic, in addition to the above techniques, the mold surfaces or cavities can be varied to produce the textured surface 701. The textured surface 701 increases friction between the surfaces of the balls 1 and the input disc 34, the low speed disc 1834, the output disc 101, and the idler 18. This reduces the amount of axial force, or clamp force required to transfer torque without slippage of these components in the transmissions 100, 600, 1800. The textured surface 701 significantly increase the surface area of the balls 1, input disc 34, low speed disc 1834, output disc 101, and the idler 18, aiding heat dissipation.

Still referring to FIG. 22, in some embodiments, a hard, wear resistant coating 702 is applied to the surfaces of the balls 1, the input disc 34, the low speed disc 1834, the output disc 101, and the idler 18. The coating 702 in some embodiments is hard, wear resistant, resilient, high friction, and bonds well to steel, such as silicon nitride. A silicon nitride coating 702 can be between 0.5 to 5 microns thick, depending on the size, speed, and torque rating of the transmissions 100, 600, and 1800. Two suitable methods to apply a silicon nitride coating to steel are plasma vapor deposition and chemical vapor deposition. The high temperatures required for some chemical vapor deposition processes make it unsuitable for some hardened steels such as 52100 and some other bearing steels because these steels will lose their temper during the coating process. In transmission 100, 600, 1800 applications where the excellent bond produced from chemical vapor deposition is required, the use of tool steel for the balls 1, the input disc 34, the low speed disc 1834, the output disc 101, and the idler 18, may be required. The increased surface area produced by the textured surface 701 increases the amount of the coating 702 that can be applied to the surfaces. The bumpiness produced by the textured surface 701 increases the strength of the mechanical bond between the surface of the textured surface 701 and the coating 702.

The embodiments described herein are examples provided to meet the descriptive requirements of the law and to illustrate various ways to practice the mechanisms, methods of use, methods of manufacturing, etc., of the present invention. The embodiments described here explain and facilitate the full comprehension and enablement of all that is disclosed here. The description of these examples is not intended to be limiting in any manner. Additionally, here terms are used in their broad respective senses unless otherwise stated. Therefore, terms should not be read as being used in any restrictive sense or as being redefined unless expressly stated as such.

What is claimed is:

1. A continuously variable transmission (CVT) comprising:
    a longitudinal axis;
    a plurality of balls distributed radially about the longitudinal axis;
    a rotatable idler in contact with each of, and radially inward of, the balls; and
    a first shaft coupled to the idler;
    an input disc in contact with the plurality of balls;
    an output disc in contact with the plurality of balls, wherein the plurality of balls is located between the input disc and the output disc, and wherein a contact point between the input disc or output disc and the plurality of balls is radially outward relative to a diameter of the idler;
    a bearing disc operationally coupled between a second shaft and the input disc;
    a plurality of perimeter ramps coupled between the bearing disc and the input disc; and
    the second shaft operationally coupled to the input disc,
    wherein the plurality of balls, the rotatable idler, and the first shaft are adapted to transmit power and
    wherein power is transferred from the second shaft to the bearing disc, to the perimeter ramps, to the input disc, to the balls, to the idler, and to the first shaft.

2. The CVT of claim 1, wherein at least one ball of the plurality of balls comprises a tiltable axis.

3. The CVT of claim 2, further comprising a cage adapted to maintain a radial position and an axial alignment of the balls.

4. The CVT of claim 1, wherein power is transferred from the first shaft to the idler, to the balls, to the input disc, to the perimeter ramps, to the bearing disc, and to the second shaft.

5. The CVT of claim 1, wherein the first shaft comprises a first plurality of transfer grooves.

6. The CVT of claim 5, further comprising a second shaft having a second plurality of transfer grooves, the second shaft coupling to the first shaft via a plurality of transfer bearings fitted between the first and second plurality of transfer grooves.

7. The CVT of claim 3, wherein the cage further comprises a first and second stator disc.

8. The CVT of claim 7, wherein further comprising a stator tube coupled to the first stator disc.

9. The CVT of claim 8, wherein the stator tube is coaxial with the first shaft.

10. The CVT of claim 8, wherein the stator tube couples to a shifting mechanism.

* * * * *